United States Patent
Zhang et al.

(10) Patent No.: US 9,524,429 B2
(45) Date of Patent: Dec. 20, 2016

(54) ENHANCED INTERPRETATION OF CHARACTER ARRANGEMENTS

(71) Applicant: Microsoft Technology Licensing, LLC, Redmond, WA (US)

(72) Inventors: Yi Zhang, Bothell, WA (US); Daniel Parish, Seattle, WA (US); Aaron Lamar Wilson, Seattle, WA (US); Shangwei Fang, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 14/465,307

(22) Filed: Aug. 21, 2014

(65) Prior Publication Data
US 2016/0055374 A1 Feb. 25, 2016

(51) Int. Cl.
G06K 9/18 (2006.01)
G06K 9/00 (2006.01)
G06K 9/68 (2006.01)

(52) U.S. Cl.
CPC ....... *G06K 9/00442* (2013.01); *G06K 9/00449* (2013.01); *G06K 9/00456* (2013.01); *G06K 9/18* (2013.01); *G06K 9/6828* (2013.01); *G06K 2209/01* (2013.01)

(58) Field of Classification Search
CPC ..... G06K 9/6828; G06K 9/18; G06K 9/00442
See application file for complete search history.

(56) References Cited

U.S. PATENT DOCUMENTS 6,337,924 B1 * 1/2002 Smith ................. G06K 9/6828
382/175
7,953,295 B2 5/2011 Vincent et al.
8,090,225 B2 1/2012 Lapstun et al.
(Continued)

FOREIGN PATENT DOCUMENTS

CN 102855232 A 1/2013

OTHER PUBLICATIONS

"ABBYY FineReader 12.0.101.264", Published on: Jul. 11, 2013 Available at: http://www.softexia.com/office-tools/abbyy-finereader/, 10 pp.
(Continued)

*Primary Examiner* — Gregory M Desire
(74) *Attorney, Agent, or Firm* — Julie Kane Akhter; Tom Wong; Micky Minhas

(57) ABSTRACT

Technologies are described herein for interpreting character arrangements. An image including an arrangement of characters may be received or captured by a computing device. Techniques described herein generate data representative of the characters. Characteristics and other information interpreted from the image may be processed to determine a data type. The data representative of the characters may be arranged into a data structure based on the data type, an arrangement type and/or other information interpreted from the image. The data type may indicate one or more attributes of the arranged data such as a format, font, date, language, or currency. The data type may also indicate how data is used in a process, equation or calculation. In addition, the data type may identify an anchor that may be used to merge data generated from the image with other data generated from another image.

18 Claims, 11 Drawing Sheets

(56) References Cited

U.S. PATENT DOCUMENTS

| | | | |
|---|---|---|---|
| 8,509,563 B2 | 8/2013 | Robinson et al. | |
| 2006/0081714 A1* | 4/2006 | King | G06F 17/277 235/472.03 |
| 2008/0024502 A1* | 1/2008 | Nagahara | G06F 17/211 345/472 |
| 2011/0164813 A1 | 7/2011 | Enomoto | |
| 2011/0225490 A1* | 9/2011 | Meunier | G06F 17/27 715/255 |
| 2012/0173226 A1 | 7/2012 | McEvoy et al. | |
| 2012/0180002 A1 | 7/2012 | Campbell et al. | |
| 2012/0189203 A1 | 7/2012 | Lin et al. | |
| 2013/0076617 A1* | 3/2013 | Csaszar | G06F 3/017 345/156 |
| 2013/0191715 A1 | 7/2013 | Raskovic et al. | |
| 2014/0104279 A1 | 4/2014 | Albrecht | |
| 2014/0173402 A1 | 6/2014 | Bastide et al. | |
| 2014/0173517 A1* | 6/2014 | Chaudhri | G06F 9/4443 715/830 |
| 2015/0310043 A1* | 10/2015 | Adelman | G06Q 30/0264 705/14.41 |
| 2016/0055659 A1 | 2/2016 | Wilson et al. | |

OTHER PUBLICATIONS

"Introducing OmniPage Cloud Service", Published on: Sep. 4, 2012, Available at: http://www.nuance.com/for-business/by-product/omnipage/omnipage-cloud-services/index.htm, 3 pp.

"ScanSnap ix500 Scanning into Excel", Published on: Feb. 20, 2014, Available at: http://www.youtube.com/watch?v=PvpH4NAzUjM, 2 pp.

"OmniPage Standard 18", Published on: Oct. 27, 2010, Available at: http://ocr-software-review.toptenreviews.com/omnipage-standard-review.html, 3 pp.

"Pearl scan solutions", Published on: Aug. 21, 2008, Available at: http://www.pearl-scan.co.uk/document-conversion/OCR-conversion.php, 2 pp.

"Fujitsu Scansnap iX500", Published on: Jan. 11, 2013, Available at: http://scanners.fcpa.fujitsu.com/scansnapit/scansnap-ix500.php, 4 pp.

"Chronoscan", Published on: Jan. 26, 2013, Available at: http://www.chronoscan.org/index.php?lang=en, 3 pp.

Embley, et al., "Table-processing paradigms: a research survey," International Journal of Document Analysis, published May 9, 2006, pp. 66-86.

Gao, et al, "View: Visual Information Extraction Widget for Improving Chart Images Accessibility", in Proceedings of the 19th International Conference on Image Processing, Sep. 30, 2012, pp. 2865-2868.

Mischenko, et al., "Chart Image Understanding and Numerical Data Extraction", in Proceedings of the 6th International Conference on Digital Information Management, Sep. 26, 2011, pp. 115-120.

International Search Report and Written Opinion issued in PCT Application No. PCT/US2015/045780 dated Oct. 22, 2015, 11 pages.

International Search Report and Written Opinion issued in PCT Application No. PCT/US2015/045778, dated Dec. 15, 2015, a counterpart to U.S. Appl. No. 14/465,307, 15 pages.

Savva, et al., "ReVision: Automated Classification, Analysis and Redesign of Chart Images," in Proceedings of the 24th Annual ACM Symposium on User Interface Software and Technology, Oct. 16, 2011, pp. 393-402.

PCT Second Written Opinion mailed Jul. 12, 2016 for PCT Applicaton No. PCT/US2015/045780, 4 pages.

* cited by examiner

| | A | B | C | D | E | F | G |
|---|---|---|---|---|---|---|---|
| 1 | COUNTRY | POPULATION | BIRTH RATE | | | | |
| 2 | NORWAY | 499,000 | 10 | | | | |
| 3 | IRELAND | 220,700 | 15 | | | | |
| 4 | ESTONIA | 24,040 | 11 | | | | |
| 5 | CYPRUS | 858,000 | 12 | | | | |
| 6 | FIJI | 848,000 | 22 | | | | |
| 7 | | | | | | | |
| 8 | | | | | | | |
| 9 | | | | | | | |
| 10 | | | | | | | |
| 11 | | | | | | | |
| 12 | | | | | | | |

*FIG. 6A*

|   | A | B | C | D | E | F | G |
|---|---|---|---|---|---|---|---|
|   | COUNTRY | GDP ($Mil) | POPULATION | BIRTH RATE | EXPORT NET $Mil | | |
| 1 | NORWAY | 499,000 | 5,124,000 | 10 | 62,800 | | |
| 2 | IRELAND | 220,700 | 4,593,000 | 15 | 45,340 | | |
| 3 | ESTONIA | 24,040 | 1,315,000 | 11 | -670 | | |
| 4 | SWEDEN | 557,938 | | | 4,000 | | |
| 5 | FIJI | 3,900 | 848,000 | 22 | -1,900 | | |
| 6 | CYPRUS | | 858,000 | 12 | | | |
| 7 | | | | | | | |
| 8 | | | | | | | |
| 9 | | 261,115 | 2,547,600 | 14 | 21,914 | | |
| 10 | | | | | | | |
| 11 | | | | | | | |
| 12 | | | | | | | |

*FIG. 6B*

ENHANCED INTERPRETATION OF CHARACTER ARRANGEMENTS

BACKGROUND

As technological advances further the performance and affordability of digital imaging components, computers and portable devices are more frequently used to capture and process images of printed documents. There are a number of applications that use different technologies, including optical character recognition ("OCR"), to process images of printed documents. For instance, some applications use such technologies to convert a printed document into a text file. Among other benefits, when compared to an image file, a text file is editable, searchable, and can be displayed more clearly using a locally available font.

Although computers may generate files that include OCR-generated text, current technologies are still limited. For instance, when an image includes text arranged in complex arrangements, manual editing and sometimes manual data entry may be required to ensure that the text has been recognized correctly. Such error prone processes may be inefficient or lead to a less than desirable user experience.

It is with respect to these and other considerations that the disclosure made herein is presented.

SUMMARY

Technologies are described herein for interpreting character arrangements. An image including an arrangement of characters may be received or captured by a computing device. Techniques disclosed herein interpret various aspects of the image, e.g., the format, color, font, alignment, position and/or associated contextual information, to generate a data structure, which may be in the form of an editable table or spreadsheet. Techniques described herein may generate data representative of the characters of the image. The characters, the arrangement of the characters and other contextual information interpreted from the image may be processed to determine an arrangement type of the image and/or a data type of at least one character. The generated data may be arranged into a data structure based on the arrangement type and/or the data type. The arrangement type may be used to determine an arrangement of the data structure, e.g., a spreadsheet, table, list, etc. The data type, for example, may indicate attributes of the generated data, such as a format, font, date, language, unit, etc. The data type may also indicate how the generated data is used in a process, equation or calculation. In addition, the data type may identify an anchor that may be used to merge data generated from the image with other data generated from another image.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6A illustrates a touch-enabled user interface displaying a table of generated data formed in accordance with the arrangement of characters of FIG. 4.

FIG. 6B illustrates the touch-enabled user interface of FIG. 6A also showing merged data generated from the image of FIG. 5.

DETAILED DESCRIPTION

Figure 1:
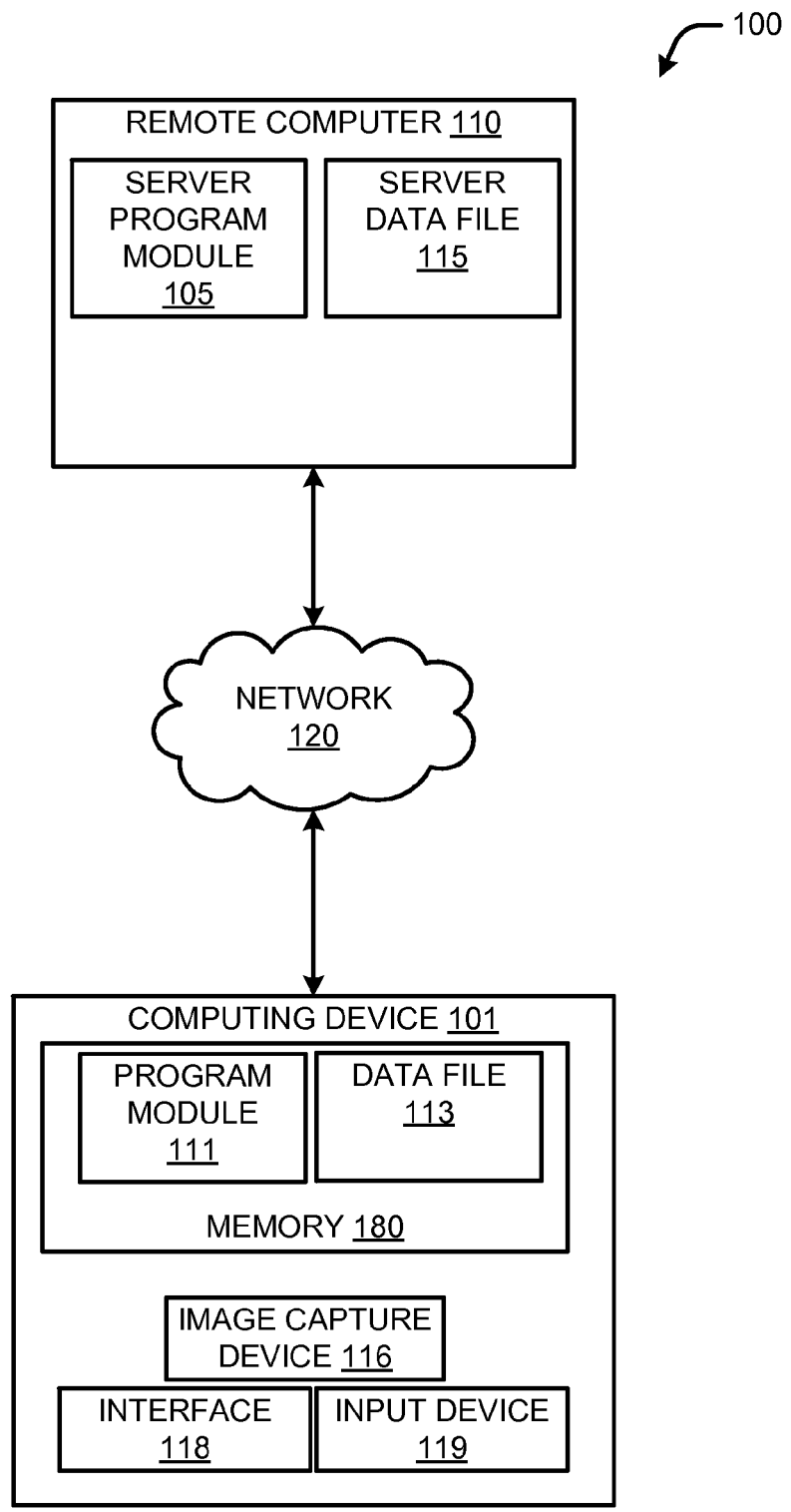
FIG. 1 is a block diagram showing several example components of a system for interpreting character arrangements.

The following detailed description is directed to concepts and technologies for interpreting character arrangements. An image including an arrangement of characters may be received or captured by a computing device. Techniques disclosed herein interpret various aspects of an image, e.g., the format, color, font, alignment, position and/or associated contextual information, to generate a data structure, which may be in the form of an editable table or spreadsheet. Techniques described herein may generate data representative of the characters of the image. The characters, the arrangement of the characters and other contextual information interpreted from the image may be processed to determine an arrangement type of the image and/or a data type of at least one character. The generated data may be arranged into a data structure based on the arrangement type and/or the data type. The arrangement type may be used to determine an arrangement of the data structure, e.g., a spreadsheet, table, or list. The data type, for example, may indicate attributes of the generated data, such as a format, font, date, language, or unit. The data type may also indicate how the generated data is used in a process, equation or calculation. In addition, the arrangement type and/or the data type may identify an anchor that may be used to merge data generated from the image with other data generated from another image.

In one example, an image may include an arrangement of characters having a number of rows and columns. The arrangement of characters may include descriptive text such as a title or header. A computing device generates data representative of the characters. Using techniques described herein, the computing device identifies the characters associated with the descriptive text, e.g., the headers and the title. The identified characters are associated with an appropriate data type, e.g., labeled as "title," "header," or "row header."

The computing device arranges the data representative of the characters into an editable data structure based on the arrangement of characters included in the image. In this example, since the image includes an arrangement having rows and columns, the data structure may be in the form of a table or spreadsheet. In addition, the arrangement of the data in the data structure may be further based on one or more data types associated with the characters. For example, data that is characterized as a header or title may be formatted differently than other data associated with other data types. In addition, the data that is characterized as a header or title may be excluded or isolated from equations or formulas that involve data associated with other data types.

In another example, multiple images may be received or captured by a computing device. Each image may contain an arrangement of characters. The computing device generates data representative of the characters and arranges the data into a data structure based on the arrangement of characters of the images. The computing device may also identify and associate data types associated with characters or groups of characters in the images. In addition, the computing device may identify data associated with common data types, also referred to herein as "anchors." The arrangement of the data in the data structure may be based on the anchors.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for interpreting character arrangements. As will be described in more detail below with respect to FIGS. 8-10, there are a number of applications and services that can embody the functionality and techniques described herein.

FIG. 1 is a system diagram showing aspects of one illustrative mechanism disclosed herein for interpreting character arrangements. As shown in FIG. 1, a system 100 may include a computing device 101, a remote computer 110 and a network 120. The computing device 101 may operate as a stand-alone device, or the computing device 101 may operate in conjunction with the remote computer 110. As can be appreciated, the remote computer 110 and the computing device 101 may be interconnected through one or more local and/or wide area networks, such as the network 120. It should be appreciated that many more network connections may be utilized than illustrated in FIG. 1.

The computing device 101 may include a local memory 180 that stores a data file 113 and a program module 111 configured to manage interactions between a user and the computing device 101. The program module 111 may be in the form of a stand-alone application, a productivity application, an operating system component or any other application or software module having features that interact with the user via an input device 119, such as a keyboard, and/or an interface 118, which may include a touch-enabled screen configured to receive gestures from the user. The program module 111 may also control an image capture device 116.

In aspects disclosed herein, the image capture device 116 may be configured to capture input images of a medium having arranged characters, such as a printed document. The image capture device 116 may be a scanner, web camera ("web cam"), camera phone, hand held camera, etc. In addition, the program module 111 may be configured to receive input images from other devices, such as the remote computer 110 or any other computing device. The captured or received input images may be stored in a data file 113 or other module or file.

The program module 111 may be configured to utilize one or more optical character recognition ("OCR") technologies to detect any optically recognizable characters printed or displayed on a medium. In addition to recognizing characters, technologies disclosed herein may interpret other aspects of any arrangement that is printed or displayed on a medium. For example, a captured image may include an arrangement of characters having columns and rows. The program module 111 and other implementations may be configured to recognize such arrangements or any other aspect of a printed or displayed arrangement having characters that are separated by blank spaces, lines, markings and/or any other formatting characteristics, patterns, shapes, markings or the like.

A captured input image may also include characters or markings that are separated, or graphically distinguished, from an arrangement of characters. As will be described below, such characters or markings may be identified as descriptive text, such as a title, anchor, or header. As will be described in more detail below, based on one or more factors, such as a format, text pattern and/or other characteristics, the program module 111 may determine one or more data types related to characters or groups of characters. The program module 111 then generates a data structure that is arranged, at least in part, based upon the determined data types.

The remote computer 110 may be in the form of a server computer or a number of server computers configured to store a server program module 105, a server data file 115 or other information associated with the user and related applications. As can be appreciated, the remote computer 110 may store a mirrored copy of the data file 113 allowing a centralized service to coordinate and assist a number of client computers, such as the computing device 101.

It can also be appreciated that the server program module 105 may be used to assist program modules executing on client computers, such as the program module 111 executing on the computing device 101. For example, as described below, the program module 111 may be configured to process an input image, and in such an implementation, the server program module 105 may be used to assist in such processing. In such implementations, all or part of the input image files and user interactions, such as those through the interface 118, may be communicated from the computing device 101 to the remote computer 110. Various operations, e.g., OCR-related operations, may be performed, at least in part, by the server program module 105. Output data from such operations may be stored in the server data file 115 and/or the data file 113.

Figure 2:
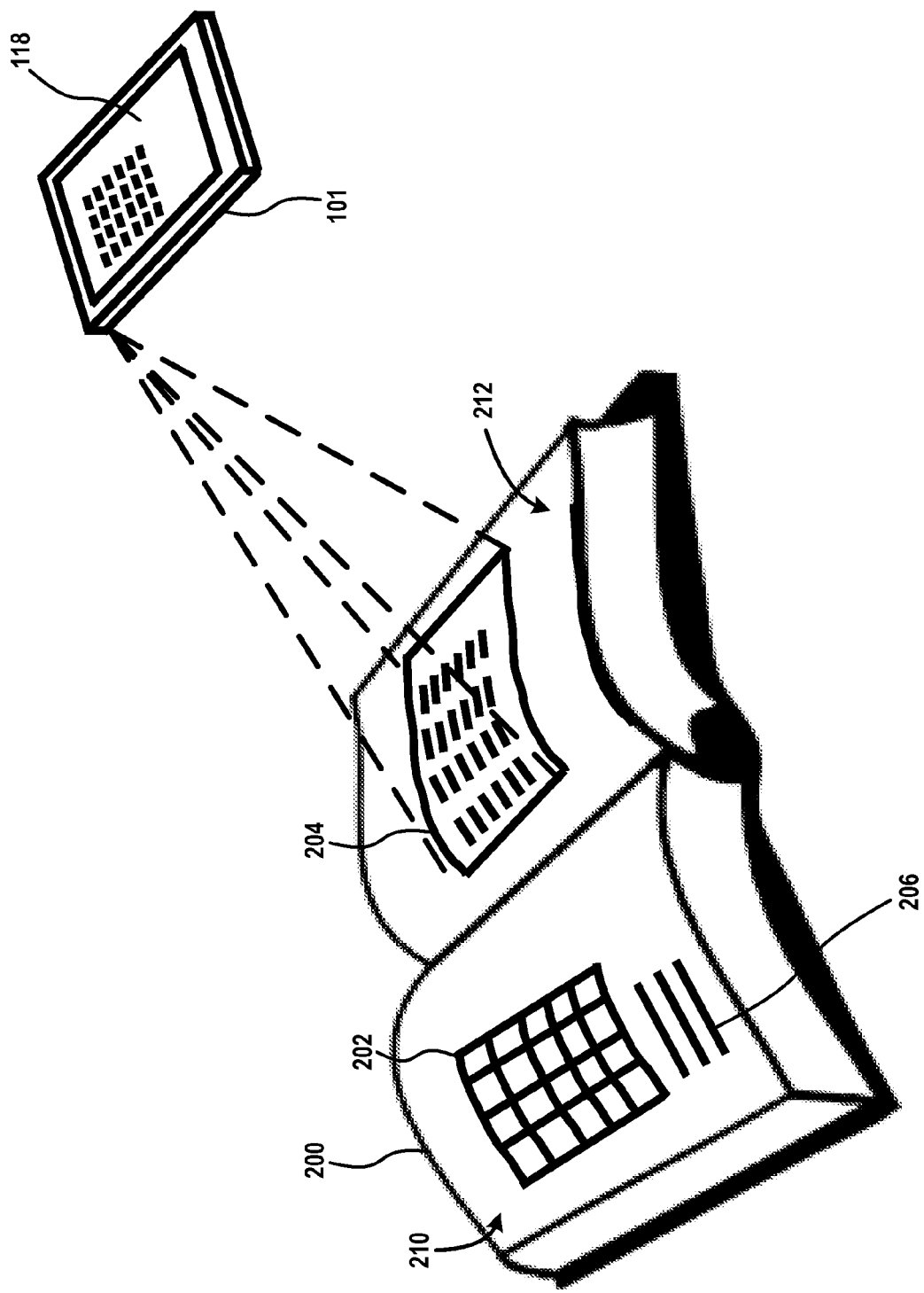
FIG. 2 is perspective view of a device for capturing an image having an arrangement of characters.

FIG. 2 shows an example scenario that illustrates how the system 100 may be used for interpreting character arrangements. As shown in FIG. 2, the computing device 101 utilizes the image capture device 116 to capture an image of arranged characters. In this illustrative example, the arranged characters are printed on a first page 210 and a second page 212 of a book 200. The book 200 may comprise arranged data with supporting gridlines, specific character patterns, such as a row or column format, or any other format or pattern. As will be described below, techniques described herein generate a data structure having editable data representing the characters of the input image.

In addition to generating a data structure having data representing the characters of the image, techniques provided herein also provide a real-time, or near real-time, display of the data structure on a user interface, such as interface 118. As will be described in more detail below, the interface 118, which may have touch-enabled input features, may enable a user to edit, select and/or process the displayed data as the image capture device 116 is capturing the input image. In addition, the generated data may be saved in a file, such as data file 113 or server data file 115, and/or the generated data may be merged with data contained in other existing files.

Figure 3:
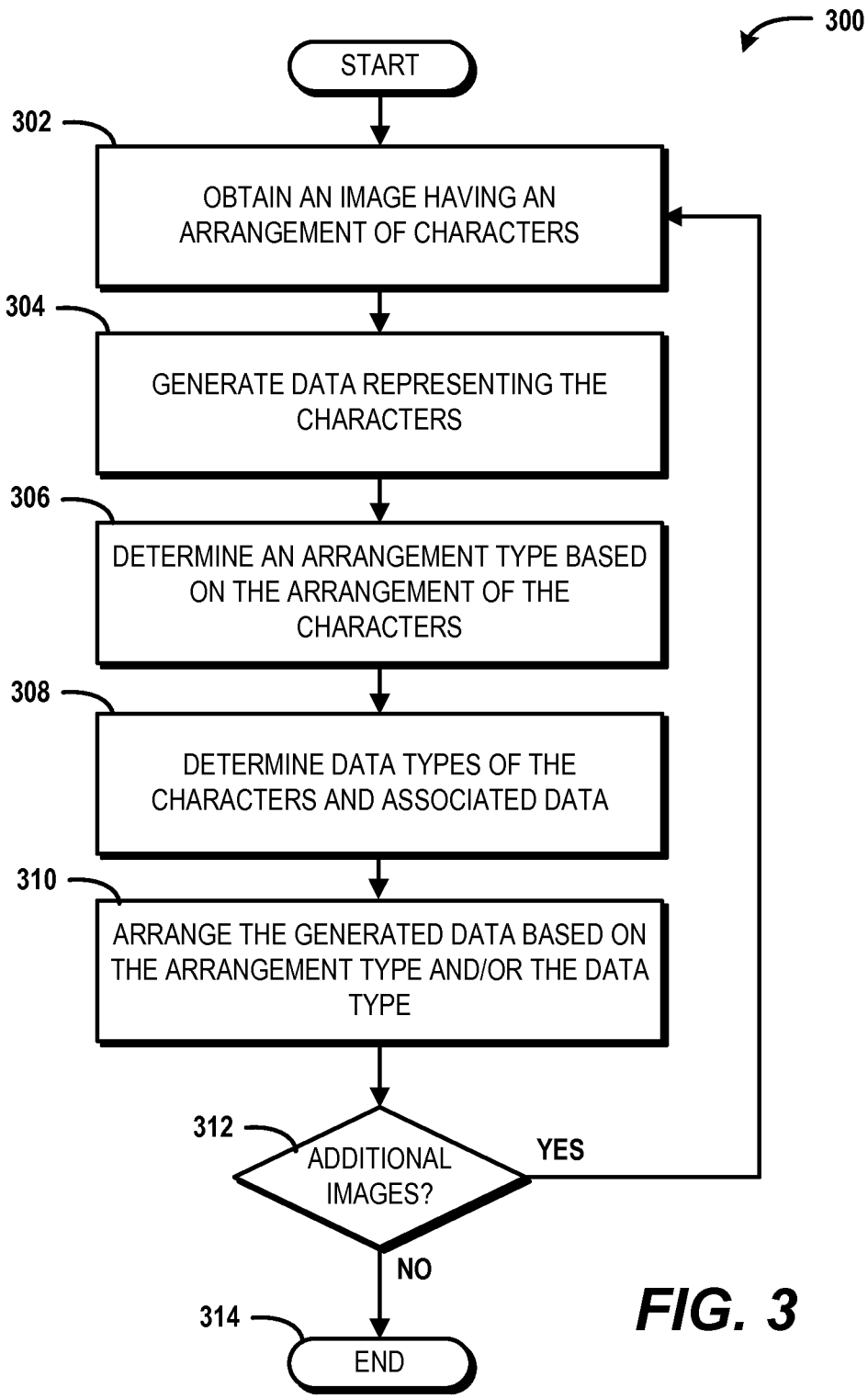
FIG. 3 is a flow diagram illustrating aspects of a method for interpreting character arrangements.

Turning now to FIG. 3, aspects of a routine 300 for interpreting character arrangements are shown and described below. Although the following description involves an example that involves the processing of arranged characters to generate arranged data in one or more tables, it should be understood that the operations of the methods disclosed herein may apply to other forms of arranged characters and other forms of generated output data. As will be described below, data types may be identified by the use of different format attributes, content, character arrangements, patterns or other context information. The identified data types, and other factors, may be used to arrange the output data.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIGS. 8-10, the operations of the routine 300 are described herein as being implemented, at least in part, by an application, such as the program module 111. Although the following illustration refers to the program module 111, it can be appreciated that the operations of the routine 300 may be also implemented in many other ways. For example, the routine 300 may be implemented by the use of a spreadsheet application 813 or any other application, e.g., a word processing application, customer relationship management ("CRM") software, or another type of application. In addition, one or more of the operations of the routine 300 may alternatively or additionally be implemented, at least in part, by a web browser application 810 of FIG. 8 or another application working in conjunction with one or more application servers 908 of FIG. 9.

With reference to FIG. 3, the routine 300 begins at operation 302, where the program module 111 obtains an image. As can be appreciated, the image may be captured by the image capture device 116 or obtained by the program module 111 using any other mechanism for communicating or capturing images, also referred to herein as "input images." For example, the input image may be captured by taking a picture of a receipt, a book, a piece of paper with text/handwriting or any other medium capable of displaying characters, even characters presented in a tabular format. In addition to being captured by the image capture device 116, such as a camera, the input image may be extracted from a static image, such as a picture, or a motion image file, such as a video. In a specific example, the input image may include characters in an arrangement, such as a table of numbers and descriptive text next to the table that describes the numbers. The image may also include handwritten notes and/or printed data.

Next, at operation 304, the program module 111 generates data representing the characters in the image. In one implementation, operation 304 may apply one or more OCR techniques to the image to generate data representing the characters, also referred to herein as "generated data." The OCR operation may be performed by the program module 111, a dedicated application such as a spreadsheet application and/or a server application such as the server program module 105. In such implementations, the program module 111 may operate autonomously allowing the computing device 101 to operate as a stand-alone device. In other implementations, the program module 111 may operate with other modules, such as the server program module 105.

If the server program module 105 is used in operation 304, the image may be communicated to the remote computer 110 for processing. In such a configuration, the remote computer 110 may communicate the data representing the characters to the program module 111 or any other module of the computing device 101 for further processing. For illustrative purposes, the generation of data representing characters or groups of characters of an image may include the generation of finite data variables, also referred herein as "individual variables" for distinct groups of characters. As will be described below, individual variables may be assigned to cells of a table, spreadsheet or used in, or applied to, different formats or arrangements.

Next, in operation 306, the program module 111 determines an arrangement type for the input image. Generally described, the arrangement type may be any data type or any other named category that is descriptive of the arrangement of data in the input image. For example, the arrangement type may be a category of charts, graphs, tables or any arrangement of text or characters. In several illustrative examples, a specific arrangement type may be a table of data, list or other like arrangement of data. Techniques disclosed herein interpret various aspects of the input image to identify and/or determine the arrangement type. For example, based on the alignment of one or more characters, the program module 111 may be configured to recognize when characters of an image are in the form of a spreadsheet or table. In such an example, the program module 111 would determine an arrangement type, which may be stored in a variable and used in subsequent operations to generate a data structure based on the determined arrangement type.

In operation 306, the program module 111 may be configured to determine an arrangement type by analyzing a position, format or pattern of one or more characters or groups of characters. In addition, the program module 111 may analyze lines, spaces, markings, contextual data or other visual indicators to identify and/or determine the arrangement of the characters. In another example, the program module 111 may also be configured to determine an arrangement type by analyzing fonts, colors, symbols and/or contextual data regarding the input image. Contextual data, which may include information related to a user, may be stored in the metadata of the input image or stored in a remote location. Text patterns, keywords or pre-coded identifiers may also be used in operation 306 to determine the arrangement type.

As also described in more detail below, the program module 111 may also use the determined arrangement type to arrange the generated data from operation 304 in a data structure based on the arrangement type, such as a table or list. An illustrative example of these aspects are described in more detail below with respect to FIG. 4. Although spreadsheets and tables are used as illustrative examples of particular arrangement types, it can be appreciated that other arrangement types may be identified in operation 306. For example, the program module 111 may identify lists, paragraphs, outlines and/or any other arrangement or combination of arrangements.

Next, at operation 308, the program module 111 may determine a data type of one or more characters in the image. In implementations of operation 308, the program module 111 analyzes various aspects of the input image and other contextual information to identify and/or determine a data type for one or more characters. Among many other examples, the program module 111 may identify a data type by analyzing a format, color, font, alignment, language or position of one or more characters. Other factors may also include a position of a character relative to other characters, a position of one or more characters relative to a line, marking or indicator, and other factors or combinations of factors.

In addition, a data type may be identified when a particular character or symbol is included in an image. For example, a specific data type may be identified when a particular character, such as "$" or "%," is identified. Other contextual information may also be used to identify a data type of a character or group of characters. At the same time, or in alternative implementations, text patterns, keywords or pre-coded identifiers may also be used in operation 308 to determine one or more data types. For example, if a table is arranged with a first column of data having consecutive numbers, characters in the first column may be associated with a particular data type such as a header. In yet another illustrative example, one or more data types may be identified by the calculation of one or more values. For instance, one or more data types may be identified by calculating the values in a column or row. Such implementations may include the calculation of an average, count, sum, or other value and patterns and/or certain layouts may be used to identify one or more data types.

The techniques of operation 308 may also associate an identified data type with data representing the one or more characters. For instance, based on a position, font and/or layout of a particular group of characters, the program module 111 may determine that the particular group of characters includes descriptive text, such as a title. The program module 111 may determine an appropriate data type for the particular group of characters and then associate the data type with data representing the particular group of characters.

In other examples, characters of the image and data representing the characters may be associated with any other data type based on a number of factors. As will be described in more detail below, determined data types may be used to characterize the generated data as borders, headers, anchors or any other component of a document, spreadsheet, or table. In addition, a data type may also characterize generated data as totals, sums, equations, formulas, macros, or any other data type that may be consumed by a computer program. Illustrative examples showing these and other aspects of operation 308 are described in more detail below with respect to FIGS. 4-7.

Figure 4:
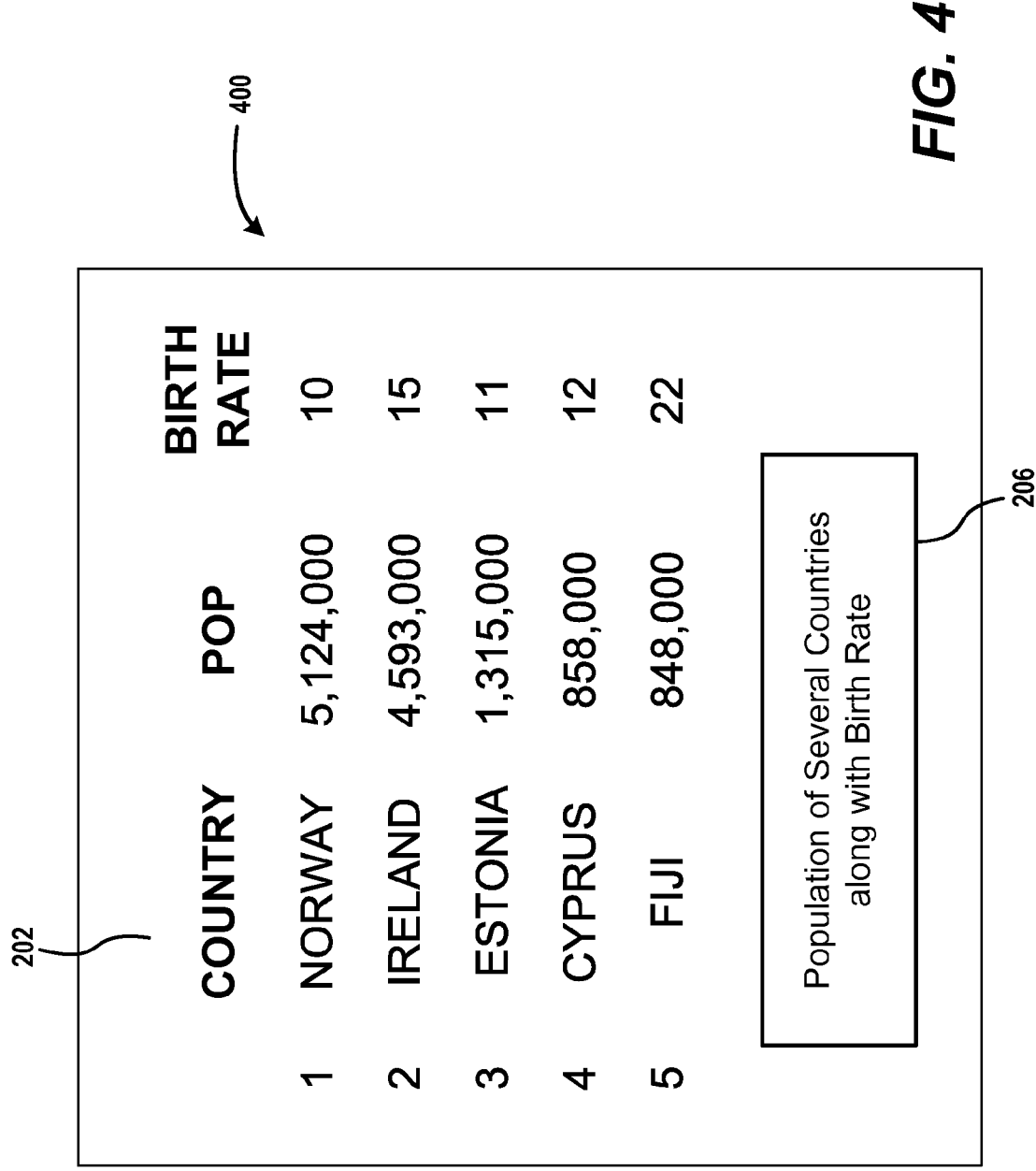
FIG. 4 illustrates an example image that includes an arrangement of characters in a table format.

Next, at operation 310, the program module 111 may arrange the data generated in operation 304 based on the identified arrangement type and/or the identified data type. In one example implementation, the program module 111 may arrange the generated data based on the identified arrangement type. For example, if the identified arrangement type is a table having a number of rows and columns, the program module 111 may generate a new table and populate cells of the table with the generated data. The arrangement of the data in the cells may correspond to the arrangement of characters or groups of characters in the input image. An illustrative example of these and other aspects are shown in FIGS. 2, 4 and 6. As will be described in more detail below with respect to these FIGURES, a first arrangement of characters 202 may be captured by a computing device 101 and arranged into a table 601A.

In other example implementations of operation 310, the program module 111 may arrange the generated data based on the identified arrangement type and the identified data type of one or more characters. Similar to the example above, if the identified arrangement type of the image is a table having a number of rows and columns, the program module 111 may generate a new spreadsheet and populate cells of the spreadsheet with the generated data. In addition, the program module 111 may arrange the data further based on one or more data types. For instance, if a character or group of characters is determined to be a header, the program module 111 may format a first row of data to visually distinguish one or more column headers from data of other cells positioned below the first row.

In addition, based on one or more data types, the program module 111 may utilize the data of a particular data type, such as the data of a first row or data of a first style, differently than data having another data type, such as data in other cells of the table. For example, and as explained in more detail below, the program module 111 may generate or apply one or more equations or calculations to data in a table. In generating, modifying or applying equations or calculations, based on the determined data types, the data of a particular data type, such as the data in the first row or data of a first style, may not be utilized in the same manner as the data of another data type, such as the data positioned below the first row or the data formatted in a second style. These and other examples presented herein show how the determined data types may be used to arrange the data according to techniques disclosed herein. It can be appreciated that these examples are provided for illustrative purposes and such examples are not to be construed as limiting. The data types might also be used for a range of applications and/or uses. For example, other implementations of operation 310 may involve a technique for arranging the generated data based on a data type alone. Thus, some implementations may not utilize the determined arrangement type. More examples illustrating these and other concepts are explained in more detail below.

In operation 310, it can be appreciated that the data may be arranged in an existing table, spreadsheet, document or other file. In addition, operation 310 may involve the generation of a new instance, file or other data structure for arranging the generated data. In such implementations, the program module 111 may generate or update a data structure of the data that may be displayed on a user interface, such as interface 118. Once displayed, a user of the computing device 101 may interact with the arranged data. As described in more detail below, the computing device 101 and the program module 111 may be configured with gesture-based controls that allow a user to edit, save, process or communicate the arranged data.

Next, in operation 312, the program module 111 determines if there are additional images to process. If it is determined that there are additional images, the routine 300 returns to operation 302 where an additional image is obtained. The routine 300 then repeats operations 302 through operation 310 in a manner as described above. Once it is determined there are no additional images to process, the routine 300 continues to operation 314 where the routine 300 ends.

As described in more detail below, the computing device 101 and the program module 111 may be configured to obtain multiple images and add generated data from each image. As can be appreciated, each iteration of operations 302-310, may include the generation of additional data, additional data types and/or arrangement types. In some implementations, subsequent iterations of operation 310 may generate data that may be added to, or used to modify, the arranged data of previous iterations of routine 300. The arrangement of the added data may be based on the arrangement of the characters in the captured images, the identified data types and/or other contextual data. In one illustrative example, which is explained in more detail below with respect to FIGS. 4, 5, 6A and 6B, data generated may be associated with one or more anchors. The one or more anchors may, in turn, be used to associate data generated from multiple images.

Figure 7:
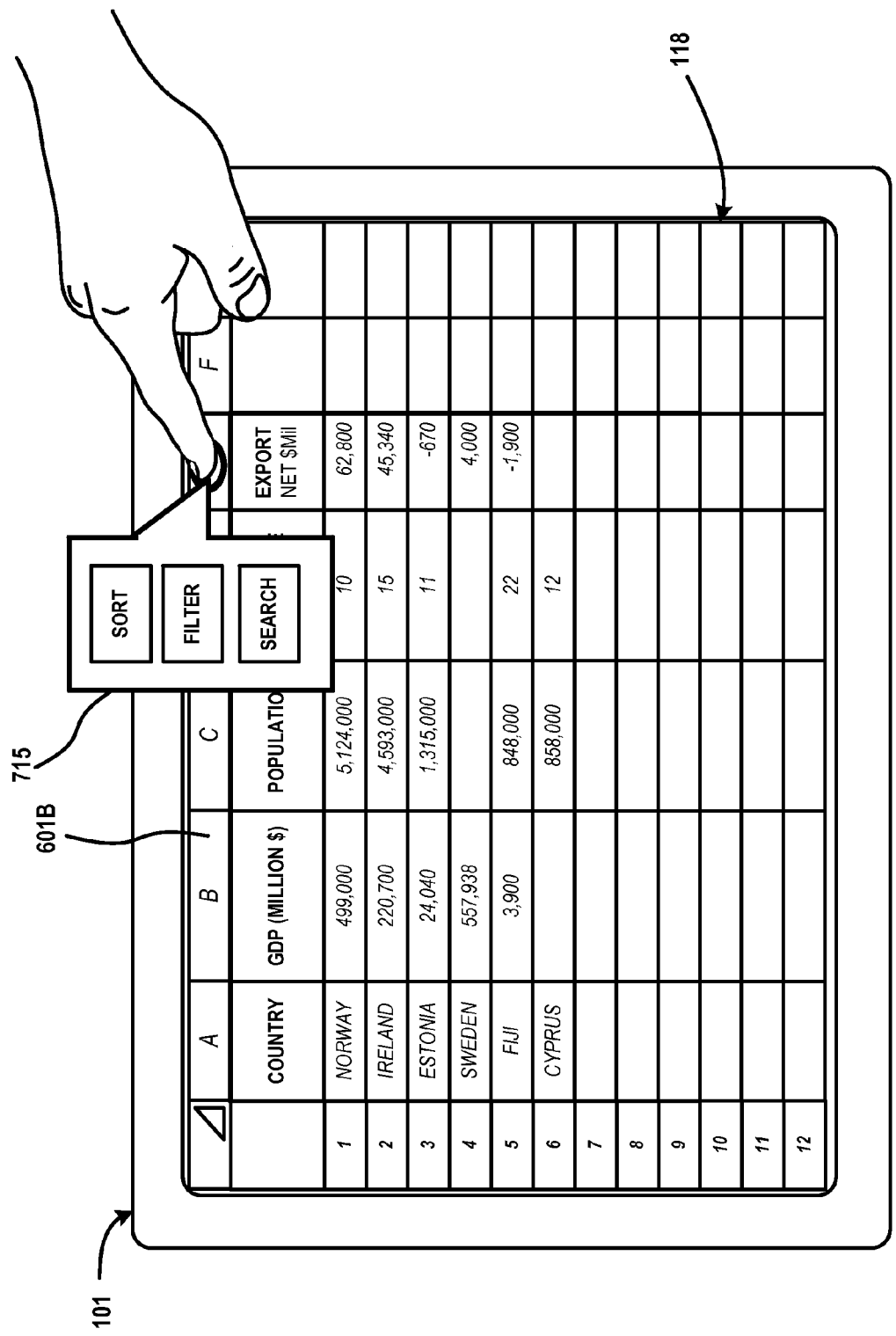
FIG. 7 illustrates the touch-enabled user interface of FIGS. 6A and 6B also showing touch-enabled controls that may be used to edit or process the generated data.

For illustrative purposes, FIGS. 2, 4, 5, 6A and 6B provide illustrative examples of techniques for interpreting character arrangements. The illustrative examples of FIGS. 2, 4, 5, 6A and 6B are applied to routine 300 to show how data that is generated from multiple images of characters that are arranged according to identified arrangement types and/or identified data types. FIGS. 6B and 7 also illustrate examples of how data from different images may be merged and modified using various forms of input, such as a touch-enabled gesture.

Referring briefly again to FIG. 2, in the illustrative example summarized above, the computing device 101 is used to capture multiple images from a book 200 that includes a print of a first arrangement of characters 202 on a first page 210, descriptive text 206 and a second arrangement of characters 204 on a second page 212. In this example, a first image 400 (shown in FIG. 4) is captured by directing the image capture device 116 of the computing device 101 at the first page 210.

Figure 5:
FIG. 5 illustrates another example image that includes an arrangement of characters in a table format displaying gridlines.

FIG. 4 provides an illustration of the first image 400, which includes the first arrangement of characters 202 and descriptive text 206. In another example, the image capture device 116 may be directed to the second arrangement of characters 204 to generate a second image 500. FIG. 5 provides an illustration of the second image 500 of the second arrangement of characters 204. As shown in FIGS. 4 and 5, for illustrative purposes, each arrangement of characters 202 and 204 also includes formatting attributes, such as lines, symbols, text formatting features and other markings with the arranged characters.

In applying operation 302 of routine 300 to the example of FIG. 4, the computing device 101 may obtain an image via the image capture device 116, such as a camera. The first image 400 includes the first arrangement 202 having a number of rows and columns. For illustrative purposes, the arrangement has three columns, each labeled with a different category by the use of column headers. In particular, the first arrangement 202 includes column headers respectfully labeled as: "COUNTRY," "POP," and "BIRTHRATE." In addition, the first arrangement 202 includes five rows, each labeled with consecutive numbers, "1," "2," "3," "4" and "5," in the first column. The first image 400 also contains the descriptive text 206 that is arranged below the bottom row, and has a length that spans several columns.

Next, in applying operation 304 of routine 300 to the present example, the program module 111 utilizes OCR techniques to generate data representing the characters or groups of characters of the first image 400. The arrangement of characters, which may be defined by the groupings of, and/or spacing between, the characters, allow the program module 111 to generate finite data variables for distinct groups of characters. For instance, individual variables and/or data instances may be generated for each character grouping, e.g., words or phrases, such as: "COUNTRY," "POP," and "BIRTH RATE." In addition, individual variables and/or data instances may be generated for each group of characters in the rows, e.g., "NORWAY," "5,124,000," and "10."

Further, operation 304 may involve the generation of data representing the descriptive text 206. As will be described in more detail below, data representing the descriptive text 206 may be used as metadata for a file storing the data. In addition, the data representing the descriptive text 206, or an image of the descriptive text 206 itself, may be interpreted and used as contextual information to determine a data type of other characters. For example, since the word "population" is in the descriptive text 206, the program module 111 may use such information to determine that the variable containing "POP" refers to "population." Such examples are provided for illustrative purposes and are not to be construed as limiting.

Next, in applying operation 306 to the present example, the program module 111 identifies an arrangement type based on various aspects of the first image 400. As summarized above, the program module 111 may analyze a format, color, font, alignment, position and/or other contextual information included in, or associated with, the first image 400 to determine an arrangement type. In addition, the program module 111 may analyze textual or graphical patterns, lines, spaces, markings and/or other visual indicators to determine or identify an arrangement type.

In the present example, given that the first image includes an arrangement of characters having a number of rows and columns of characters, the program module 111 may identify the arrangement type as a table, data table, spreadsheet, or any other arrangement that accommodates rows and columns of data. In addition, other factors may be used to identify the arrangement, such as contextual information stored in association with a user account, or location information. For instance, if a user profile indicates a user is an accountant, or if a user is standing in a U.S. Internal Revenue Service ("IRS") office, a specific tax spreadsheet format may be identified as the arrangement type. As can be appreciated, these examples are provided for illustrative purposes and are not to be construed as limiting as many other types of arrangements may be identified.

Next, in applying operation 308 to the present example, the program module 111 identifies a data type of one or more characters in the first image 400. As summarized above, the program module 111 may identify a data type by analyzing a pattern, format, font, color, alignment, position and/or other contextual information contained in, or associated with, the input image. Other factors may also include a position of a character relative to other characters, a position of one or more characters relative to a line, marking or indicator and/or other factors or combinations of factors.

In present example, the first arrangement 202 of the first image 400 includes a number of visual characteristics that are used to identify data types for the characters or groups of characters. For instance, the pattern of consecutive numbers along the first column may be characterized as a "row header." Thus, in this example, individual numbers in the first column, e.g., 1, 2, 3, 4 and 5, may be identified as a pattern indicative of, and associated with, a data type labeled as a "row header." Similarly, given the position, font, text size and/or other factors, e.g., bolded text, the first row of characters may be identified as a pattern indicative of, and associated with, a data type labeled as a "column header." Thus, in this example, each group of characters in the first row, e.g., "COUNTRY," "POP," and "BIRTH RATE," may be identified as, and associated with, a data type characterized as a "column header."

Other characters or groups of characters in the first arrangement 202 may be identified and associated with a data type based on the identification of the row headers and the column headers. For example, the words aligned under the column header "COUNTRY," e.g., "NORWAY," "IRELAND," "ESTONIA," "CYPRUS" and "FIJI," may be associated with a data type labeled as "COUNTRY." Groups of characters aligned under the other headers, e.g., "POP" and "BIRTH RATE," are associated with a corresponding data type in a manner as described above. For example, the group of characters "5,214,000" may be identified and associated with a data type labeled as "POP."

In addition, other data types may be identified and associated with the characters or groups of characters depicted in the first arrangement 202. For instance, since all of the numbers aligned in the column under the column header "POP" are integers, the numbers, such as "5,214,000," may be labeled as an "integer" data type. Other data types may be identified by using techniques similar to those described above. For instance, if a group of characters included a number with a fraction or decimal value, other data types, such as a floating point may be identified.

In other examples, if currency symbols are used, different data types may be identified for characters or groups of characters associated with such respective symbols. As can be appreciated, other indicators, such as a font, keyword, specific number, character pattern and/or other attributes may indicate a data type. In addition, contextual information, such as information from a user profile, a user's location and/or other text of an existing document stored in the computing device 101 or another computing device may be used to identify and associate one or more data types. For example, a title or descriptive text may be used to identify one or more data types. The use of any attribute, contextual information and/or other factors to identify and associate a data type is within the scope of this disclosure.

As can be appreciated, the program module 111 may make other associations between the generated data variables. For instance, since the group of characters "5,214,000" is horizontally aligned with the group of characters "1," "NORWAY" and "10," each of these variables may be associated with one another and/or associated with a common data type. In another illustrative example, the program module 111 may use definitions of the words and other contextual data to determine a data type and/or associations between the variables. For instance, since the column header "COUNTRY," by definition, is a word that is generally used to describe the variables positioned in the same column, the header and the variables in rows 1-5, e.g., "NORWAY," "IRELAND," etc., may be associated with one another and/or associated with a common data type.

Also shown in FIG. 4, the first arrangement 202 of the first image 400 includes descriptive text 206, which is arranged in a position below the columns and rows of characters. In this example, the position and layout of this group of characters spans across several columns, thus the program module 111 may identify this group of characters as a "title" or other descriptive data type. As mentioned above, contextual information may also be used to determine a data type. Thus, in this example, keywords from the descriptive text 206 may be used to identify a data type for other generated data. For instance, since the descriptive text 206 contains the word "population," the program module 111 may use this context to associate the header "POP," with the word "population." Such information can be used to generate editable data structures, as described in more detail below.

Returning again to FIG. 3, once the data types are identified, the routine 300 continues to operation 310 where the program module 111 may arrange the generated data based on the determined arrangement type and/or the determined data types. In the present example, as described above, the program module 111 determined that that the first arrangement 202 is a table or a format analogous to a spreadsheet. Thus, in applying operation 310 to the present example, the generated data representing the characters or groups of characters of the first image 400 may be arranged in a data structure, such as a table. In addition, the data may be arranged in the table based on the identified data types and other associations of the generated data. An example of a resulting arrangement is show in FIG. 6A.

FIG. 6A shows an interface 118 of the computing device 101 illustrating aspects of a table 601A containing generated data having an arrangement that is based on the arrangement of the characters of the first image 400. In addition, the arrangement of the table 601A is also based on the identified data types. Similar to the arrangement of characters of the first image 400, the table 601A comprises three columns, each labeled with a different category by the use of column headers. In particular, the first arrangement 202 includes column headers respectfully labeled as: "COUNTRY," "POP," and "BIRTHRATE." In addition, the first arrangement 202 includes a number of rows, each labeled with consecutive numbers formatted as row headers. The remaining data is also arranged in accordance with the data types and associations described above.

It can be appreciated that the data representing the descriptive text 206 captured in the first image 400 may be used as metadata for the table 601A, which may or may not be displayed on the interface 118. In addition, the data representing the descriptive text 206 may be used for other purposes, e.g., the data may be included in a filename, a data type, or other contextual information to be utilized by techniques disclosed herein.

Returning again to FIG. 3, upon completion of operation 310, the routine 300 continues to operation 312 where the program module 111 determines if there are additional images to process. In the present example, the computing device 101 is used to capture a second image 500. Thus, upon receiving an indication that the second image 500 is present, the routine 300 returns back to operation 302 for a second iteration of the routine 300.

In the second iteration of the routine 300, which involves the processing of the second image 500 of FIG. 5, operations 302, 304, 306 and 308 are executed in a manner similar to the processing of the first image 400, as described above. Briefly described, in operation 302, the second image 500 of FIG. 5 is obtained by the program module 111. As shown in FIG. 2, this part of the process may involve creating a second image 500 of the book 200. Next, in operation 304, the program module 111 may generate data representing the characters of the second image 500, and in operation 306, the program module 111 may identify an arrangement type of the second image 500. In this example, the arrangement of the characters may be characterized by the gridlines and/or the alignment of the characters or group of characters. Since the second arrangement 204 of the second image 500 includes rows and columns of characters, the program module 111 may identify the arrangement as a table, spreadsheet or any other arrangement that accommodates rows and columns of data. As also shown in FIG. 5, the second arrangement 204 also includes gridlines, which may also be used by the program module 111 to identify the arrangement type.

Next, in the second iteration of operation 308, the program module 111 may identify a data type of one or more characters in the second image 500. As described above, the program module 111 may determine a data type by analyzing various aspects of the arrangement of characters of the image. For instance, the program module 111 may determine a data type by analyzing format, font, color alignment, position or other contextual information of one or more characters or other aspects of the image.

In applying operation 308 to the example involving the second arrangement 204 of the second image 500, a number of data types may be determined. For instance, the text arranged in the top row may be characterized and/or labeled as a particular data type, such as a "column header." The program module 111 may be configured to determine such a data type by the use of a number of factors, such as the position, arrangement and/or particular keywords included in the top row.

In addition, various data types may be identified for characters, words, numbers or groups of characters in each cell depicted in the second image 500. In this process, the contextual meaning of one or more keywords found in an image may be used to determine one or more data types. For instance, given the position and meaning of the keywords, the word "NORWAY" may be identified as data that is associated with a data type that is also associated with the column header "COUNTRY." In addition, given the text and symbols of the column header, the numbers positioned below the "GDP" heading may be associated with a data type that is characterized and/or labeled as a "currency" or "US currency in the millions." In such an example, the meaning of "GDP" or other keywords may indicate a data type for characters that are aligned with, or associated with, such keywords.

As described above, contextual data may be obtained or interpreted to determine one or more data types. For example, the program module 111 may interpret a combination of the words in an arrangement, such as "COUNTRY," "GDP" and "EXPORT." The meaning of the words, whether they are used together or individually, may allow the program module 111 to determine a data type indicating, for example, a currency in units of "millions."

The program module 111 may also access an external computer, such as the remote computer 110, a search engine or another resource, and obtain additional information related to these keywords. In one illustrative example, in such an operation, a search may also obtain information that may be used to determine a data type. In the present example, the program module 111 determined that values aligned under the "EXPORT" column header may be characterized and/or labeled as a particular data type, such as a "US currency in the millions." These examples are provided for illustrative purposes and not to be construed as limiting.

Operation 308 may also use the above-described techniques to identify anchors that may be used to merge data from different tables. For example, given that the first arrangement 202 and the second arrangement 204 both have a column labeled as "COUNTRY," the program module 111 may identify these columns as an anchor column. As will be described in more detail below, data that is characterized and/or labeled as a particular data type, such as a "an anchor," may be used to merge data from multiple sources, such as multiple images captured by the computing device 101.

Next, in the second iteration of operation 310, the program module 111 may arrange the data generated from the second arrangement 204 based on the arrangement type and/or the identified data type. In the second iteration of operation 310, or any other subsequent iteration of operation 310, the program module 111 may take one or more different actions while arranging the data. For instance, the program module 111 may create a new file or other data structure that may enable the display and/or storage of the generated data representing characters of the second image 500. Such a data structure may contain data generated from the second arrangement 204, and the data structure may be displayed in a manner similar to the table 601A shown in FIG. 6A.

In addition to, or alternative to, creating a new file or another data structure, the program module 111 may merge the data generated from the second arrangement 204 into an existing data structure. For example, data generated from the second arrangement 204 may be merged into the table 601A depicted in FIG. 6A. In such implementations, the program module 111 may utilize one or more anchors to merge the data.

In the present example, since the first arrangement 202 and the second arrangement 204 both have a column labeled as "COUNTRY," as summarized above, the program module 111 may identify these columns as an anchor column. Generally described, the data from the first arrangement 202 and the second arrangement 204 may be merged based on the identified anchor column. One illustrative example of a table including this merged data is shown in FIG. 6B.

Referring to FIG. 6B, the table 601B, which is a modified version of the table 601A shown in FIG. 6A, includes the generated data from the first iteration and the second iteration of routine 300. Specifically, the table 601B includes the column headers from the first image 400, which includes the column headers labeled as: "COUNTRY," "POP," and "BIRTHRATE." In addition, the table 601B also includes the column headers from the second image 500, which includes the column headers labeled as: "GDP ($Mil)" and "EXPORT (NET $Mil)." As can be appreciated, the program module 111 may use the determined data types to position and format the headers and other data shown in FIG. 6B.

In the example depicted in FIG. 6B, given the identified anchor column, the data associated with the header, "COUNTRY" is merged into the same column. Specifically, the countries listed in the first arrangement 202 and the second arrangement 204 are arranged in column A of the table 601B. In addition, by using the determined data types, other data may be respectively associated with each country and the appropriate headers. For example, for "NORWAY," the "GDP" column correspondingly lists a value of "499,000," the "POPULATION" column correspondingly lists a value of "5,124,000," the "BIRTHRATE" column correspondingly lists a value of "10," and the "EXPORT" column correspondingly lists a value of "62,800."

As can be appreciated, in this example, given that certain variables were associated with a country and a header, the process of merging the data maintains the appropriate associations, as shown in FIG. 6B. Thus, even though the first arrangement 202 and the second arrangement 204 may not have all of the values, the associations between the data and headers are maintained. Accordingly, in this example, there are blank fields in the "GDP" and "EXPORT" columns for "CYPRUS" since this information was not provided in either image.

As summarized above, operation 310 may arrange the data in the table 601B by interpreting various aspects of an image and/or an arrangement of characters. In one aspect of operation 310, the program module 111 may also generate equations, relationships and other associations based on one or more aspects of each input image and/or other contextual information. For instance, if the program module 111 identifies a pattern of numbers or letters, the program module 111 may generate one or more equations, formulas, macros and/or other functions that utilize the identified numbers or letters.

In one illustrative example, given the pattern of numbers in Column C and the association between the data and the header "BIRTH RATE," the program module 111 may automatically generate a formula or equation to calculate a sum, average or other useful value. Row 9 of the table 601B shown in FIG. 6B illustrates one such example where averages for the various "integer" data types are calculated. As shown, given that the headers have different data types, the equations were not configured to include the data in the headers. Such examples are provided for illustrative purposes and not to be construed as limiting.

As briefly described above, techniques disclosed herein provide mechanisms that allow for a real-time generation of editable data that may be captured from characters that are displayed or printed on any medium. By using the techniques described herein, generated data, which may be displayed in a table or spreadsheet format, may be displayed on the interface 118 of the computing device 101. A user may use any input device, such as a touch-enabled display to edit, select, send, save and/or process the generated data.

FIG. 7 illustrates the interface 118 of the computing device 101 that enables a user to apply touch-enabled controls to the generated data of the table 601B. As shown, a user may invoke the display of a menu 715 that may have one or more controls for manipulating and processing the data. Although the menu 715 displays buttons for sort, filter and search functions, it can be appreciated that such touch-enabled controls may involve any function for manipulating, processing, sending or saving the data of the table 601B.

In other implementations, other touch-enabled controls may not involve the use of a menu. For example, a user may be able to select, remove, process or otherwise edit data of a particular cell by touching the cell and performing one or more gestures. In one illustrative example, a user may select one or more cells by tapping on the desired cells. Then the user may delete the cells by "flicking" the cells in a particular direction. Other forms of input may be used to modify or process the data of the table 601B as well. For instance, data may be processed, saved, changed or added by the use of voice commands and/or gestures captured by the image capture device 116. Although these examples are provided for illustrative purposes, such examples should not be construed as limiting.

Figure 8:
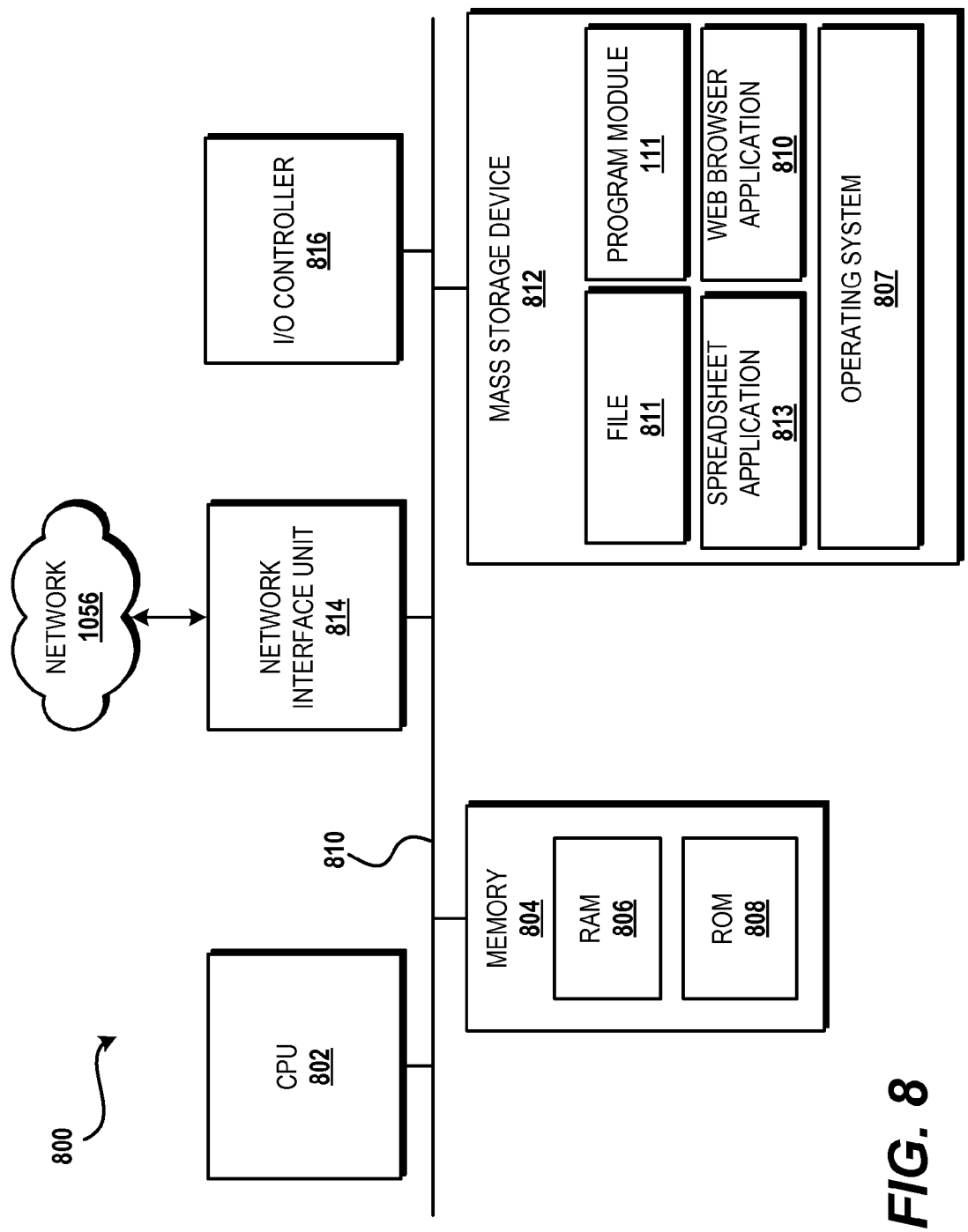
FIG. 8 is a computer architecture diagram illustrating an illustrative computer hardware and software architecture for a computing system capable of implementing aspects of the techniques and technologies presented herein.

FIG. 8 shows additional details of an example computer architecture 800 for a computer, such as the computing device 101 (FIG. 1), capable of executing the program components described above for interpreting character arrangements. Thus, the computer architecture 800 illustrated in FIG. 8 illustrates an architecture for a server computer, mobile phone, a PDA, a smart phone, a desktop computer, a netbook computer, a tablet computer, and/or a laptop computer. The computer architecture 800 may be utilized to execute any aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 807, and one or more application programs including, but not limited to, the spreadsheet application 813, program module 111, and a web browser application 810. The illustrated mass storage device 812 may also store a file 811, which may be a spreadsheet file or a file configured to store a table or spreadsheet or chart.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes the claims, the phrase "computer storage medium," "computer-readable storage medium" and variations thereof, does not include waves, signals, and/or other transitory and/or intangible communication media, per se.

According to various configurations, the computer architecture 800 may operate in a networked environment using logical connections to remote computers through the network 1056 and/or another network (not shown). The computer architecture 800 may connect to the network 1056 through a network interface unit 814 connected to the bus 810. It should be appreciated that the network interface unit 814 also may be utilized to connect to other types of networks and remote computer systems. The computer architecture 800 also may include an input/output controller 816 for receiving and processing input from a number of other devices, including a keyboard, mouse, or electronic stylus (not shown in FIG. 8). Similarly, the input/output controller 816 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Figure 9:
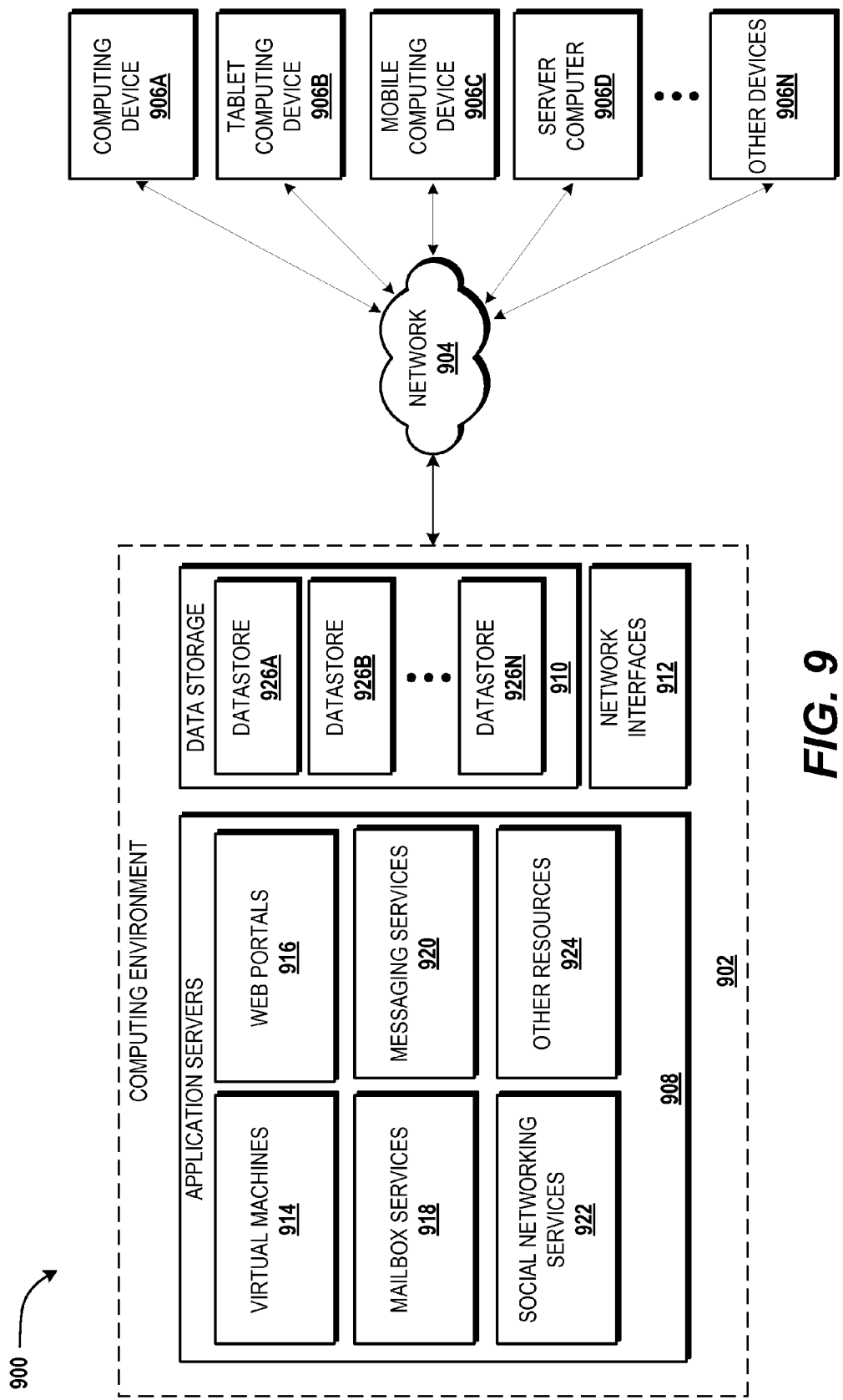
FIG. 9 is a diagram illustrating a distributed computing environment capable of implementing aspects of the techniques and technologies presented herein.

FIG. 9 depicts an illustrative distributed computing environment 900 capable of executing the software components described herein for interpreting character arrangements, among other aspects. Thus, the distributed computing environment 900 illustrated in FIG. 9 can be utilized to execute any aspects of the software components presented herein. For example, the distributed computing environment 900 can be utilized to execute aspects of the spreadsheet application 813, the program module 111 and/or other software components described herein.

According to various implementations, the distributed computing environment 900 includes a computing environment 902 operating on, in communication with, or as part of the network 904. The network 904 may be or may include the network 1056, described above with reference to FIG. 8. The network 904 also can include various access networks.

One or more client devices 906A-906N (hereinafter referred to collectively and/or generically as "clients 906") can communicate with the computing environment 902 via the network 904 and/or other connections (not illustrated in FIG. 9). In the illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902. Two example computing architectures for the clients 906 are illustrated and described herein with reference to FIGS. 8 and 10. It should be understood that the illustrated clients 906 and computing architectures illustrated and described herein are illustrative, and should not be construed as being limited in any way.

In the illustrated configuration, the computing environment 902 includes application servers 908, data storage 910, and one or more network interfaces 912. According to various implementations, the functionality of the application servers 908 can be provided by one or more server computers that are executing as part of, or in communication with, the network 904. The application servers 908 can host various services, virtual machines, portals, and/or other resources. In the illustrated configuration, the application servers 908 host one or more virtual machines 914 for hosting applications or other functionality. According to various implementations, the virtual machines 914 host one or more applications and/or software modules for interpreting character arrangements. It should be understood that this configuration is illustrative, and should not be construed as being limiting in any way. The application servers 908 also host or provide access to one or more portals, link pages, Web sites, and/or other information ("Web portals") 916.

According to various implementations, the application servers 908 also include one or more mailbox services 918 and one or more messaging services 920. The mailbox services 918 can include electronic mail ("email") services. The mailbox services 918 also can include various personal information management ("PIM") services including, but not limited to, calendar services, contact management services, collaboration services, and/or other services. The messaging services 920 can include, but are not limited to, instant messaging services, chat services, forum services, and/or other communication services.

The application servers 908 also may include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 922 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from MICROSOFT CORPORATION in Redmond, Wash. Other services are possible and are contemplated.

The social networking services 922 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the above configurations are illustrative, and should not be construed as being limited in any way. According to various implementations, the social networking services 922 may host one or more applications and/or software modules for providing the functionality described herein for interpreting character arrangements. For instance, any one of the application servers 908 may communicate or facilitate the functionality and features described herein. For instance, a social networking application, mail client, messaging client or a browser running on a phone or any other client 906 may communicate with a networking service 922 and facilitate the functionality, even in part, described above with respect to FIG. 3.

As shown in FIG. 9, the application servers 908 also can host other services, applications, portals, and/or other resources ("other resources") 924. The other resources 924 can include, but are not limited to, OCR or spreadsheet display functionality. It thus can be appreciated that the computing environment 902 can provide integration of the concepts and technologies disclosed herein provided herein with various mailbox, messaging, social networking, and/or other services or resources.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the application servers 813 and/or other data. Although not illustrated in FIG. 9, the datastores 926 also can host or store spreadsheet documents, algorithm for execution by a recommendation engine, and/or other data utilized by a spreadsheet application program. Aspects of the datastores 926 may be associated with a service, such as the ONEDRIVE, DROPBOX or GOOGLE DRIVE cloud-based storage services from their respective providers.

The computing environment 902 can communicate with, or be accessed by, the network interfaces 912. The network interfaces 912 can include various types of network hardware and software for supporting communications between two or more computing devices including, but not limited to, the clients 906 and the application servers 908. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the clients 906. It should be understood that the clients 906 can include real or virtual machines including, but not limited to, server computers, web servers, personal computers, mobile computing devices, smart phones, and/or other devices. As such, various implementations of the concepts and technologies disclosed herein enable any device configured to access the distributed computing environment 900 to utilize the functionality described herein for interpreting character arrangements, among other aspects. In one specific example, as summarized above, techniques described herein may be implemented, at least in part, by the web browser application 810 of FIG. 8, which works in conjunction with the application servers 908 of FIG. 9.

Figure 10:
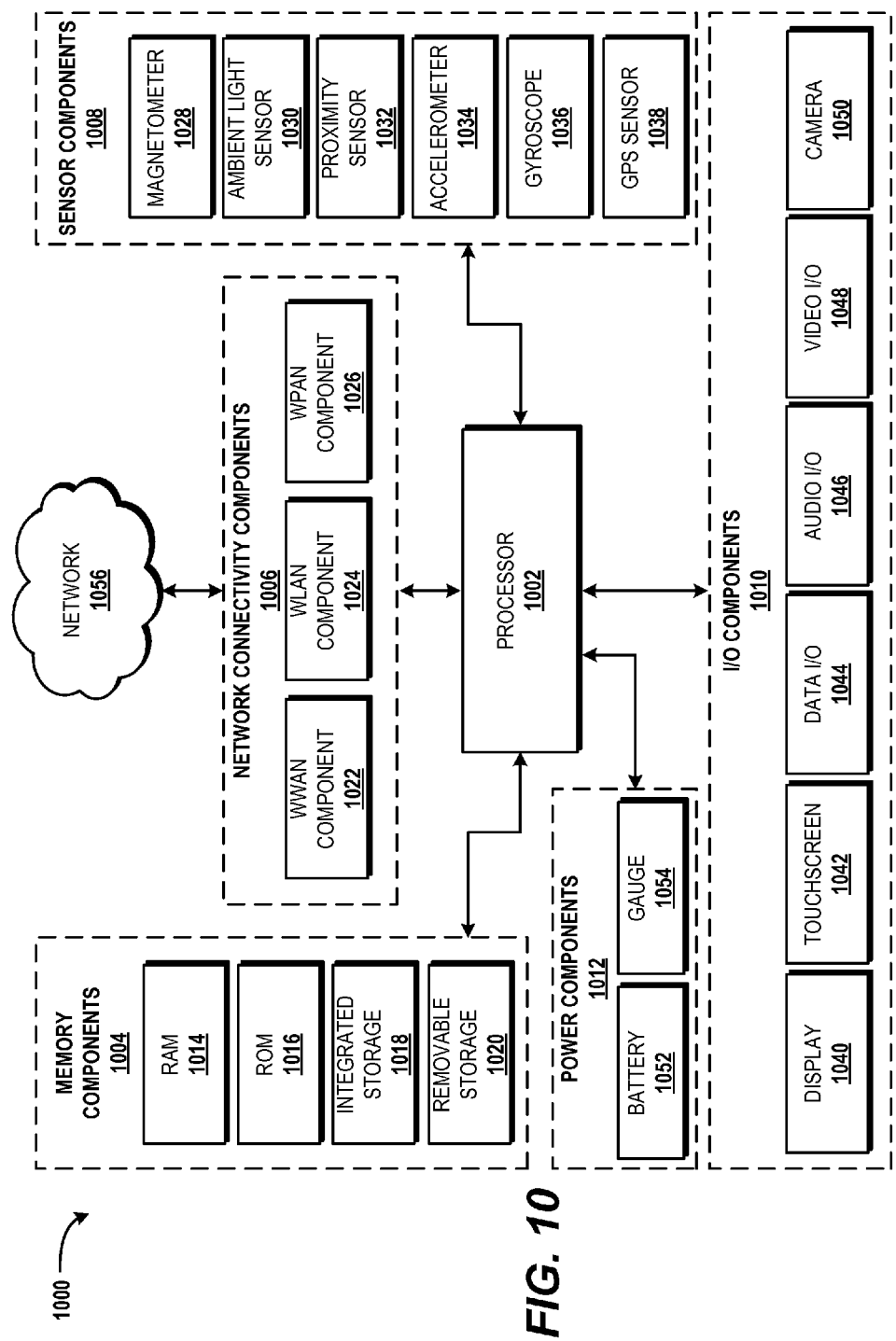
FIG. 10 is a computer architecture diagram illustrating a computing device architecture for a computing device capable of implementing aspects of the techniques and technologies presented herein.

Turning now to FIG. 10, an illustrative computing device architecture 1000 for a computing device that is capable of executing various software components described herein for interpreting character arrangements. The computing device architecture 1000 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1000 is applicable to any of the clients 906 shown in FIG. 9. Moreover, aspects of the computing device architecture 1000 may be applicable to traditional desktop computers, portable computers (e.g., laptops, notebooks, ultra-portables, and netbooks), server computers, and other computer systems, such as described herein with reference to FIG. 8. For example, the single touch and multi-touch aspects disclosed herein below may be applied to desktop computers that utilize a touchscreen or some other touch-enabled device, such as a touch-enabled track pad or touch-enabled mouse.

The computing device architecture 1000 illustrated in FIG. 10 includes a processor 1002, memory components 1004, network connectivity components 1006, sensor components 1008, input/output components 1010, and power components 1012. In the illustrated configuration, the processor 1002 is in communication with the memory components 1004, the network connectivity components 1006, the sensor components 1008, the input/output ("I/O") components 1010, and the power components 1012. Although no connections are shown between the individuals components illustrated in FIG. 10, the components can interact to carry out device functions. In some configurations, the components are arranged so as to communicate via one or more busses (not shown).

The processor 1002 includes a central processing unit ("CPU") configured to process data, execute computer-executable instructions of one or more application programs, and communicate with other components of the computing device architecture 1000 in order to perform various functionality described herein. The processor 1002 may be utilized to execute aspects of the software components presented herein and, particularly, those that utilize, at least in part, a touch-enabled input.

In some configurations, the processor 1002 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 1002 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1002 is, or is included in, a system-on-chip ("SoC") along with one or more of the other components described herein below. For example, the SoC may include the processor 1002, a GPU, one or more of the network connectivity components 1006, and one or more of the sensor components 1008. In some configurations, the processor 1002 is fabricated, in part, utilizing a package-on-package ("PoP") integrated circuit packaging technique. The processor 1002 may be a single core or multi-core processor.

The processor 1002 may be created in accordance with an ARM architecture, available for license from ARM HOLDINGS of Cambridge, United Kingdom. Alternatively, the processor 1002 may be created in accordance with an x86 architecture, such as is available from INTEL CORPORATION of Mountain View, Calif. and others. In some configurations, the processor 1002 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1004 include a random access memory ("RAM") 1014, a read-only memory ("ROM") 1016, an integrated storage memory ("integrated storage") 1018, and a removable storage memory ("removable storage") 1020. In some configurations, the RAM 1014 or a portion thereof, the ROM 1016 or a portion thereof, and/or some combination the RAM 1014 and the ROM 1016 is integrated in the processor 1002. In some configurations, the ROM 1016 is configured to store a firmware, an operating system or a portion thereof (e.g., operating system kernel), and/or a bootloader to load an operating system kernel from the integrated storage 1018 and/or the removable storage 1020.

The integrated storage 1018 can include a solid-state memory, a hard disk, or a combination of solid-state memory and a hard disk. The integrated storage 1018 may be soldered or otherwise connected to a logic board upon which the processor 1002 and other components described herein also may be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some configurations, the removable storage 1020 is provided in lieu of the integrated storage 1018. In other configurations, the removable storage 1020 is provided as additional optional storage. In some configurations, the removable storage 1020 is logically combined with the integrated storage 1018 such that the total available storage is made available as a total combined storage capacity. In some configurations, the total combined capacity of the integrated storage 1018 and the removable storage 1020 is shown to a user instead of separate storage capacities for the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various configurations, the operating system includes, but is not limited to, SYMBIAN OS from SYMBIAN LIMITED, WINDOWS MOBILE OS from MICROSOFT CORPORATION of Redmond, Wash., WINDOWS PHONE OS from MICROSOFT CORPORATION, WINDOWS from MICROSOFT CORPORATION, PALM WEBOS from HEWLETT-PACKARD COMPANY of Palo Alto, Calif., BLACKBERRY OS from RESEARCH IN MOTION LIMITED of Waterloo, Ontario, Canada, IOS from APPLE INC. of Cupertino, Calif., and ANDROID OS from GOOGLE, INC. of Mountain View, Calif. Other operating systems are contemplated.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from the network 1056 or another network, which may be a WWAN, a WLAN, or a WPAN. Although only the network 1056 is illustrated, the network connectivity components 1006 may facilitate simultaneous communication with multiple networks, including the network 904 of FIG. 9. For example, the network connectivity components 1006 may facilitate simultaneous communications with multiple networks via one or more of a WWAN, a WLAN, or a WPAN.

The network 1056 may be or may include a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1056 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 104 may be configured to provide voice and/or data communications with any combination of the above technologies. The network 1056 may be configured to or adapted to provide voice and/or data communications in accordance with future generation technologies.

In some configurations, the WWAN component 1022 is configured to provide dual-multi-mode connectivity to the network 1056. For example, the WWAN component 1022 may be configured to provide connectivity to the network 1056, wherein the network 1056 provides service via GSM and UMTS technologies, or via some other combination of technologies. Alternatively, multiple WWAN components 1022 may be utilized to perform such functionality, and/or provide additional functionality to support other non-compatible technologies (i.e., incapable of being supported by a single WWAN component). The WWAN component 1022 may facilitate similar connectivity to multiple networks (e.g., a UMTS network and an LTE network).

The network 1056 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1024 is configured to connect to the network 1056 via the WI-FI access points. Such connections may be secured via various encryption technologies including, but not limited, WI-FI Protected Access ("WPA"), WPA2, Wired Equivalent Privacy ("WEP"), and the like.

The network 1056 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1026 is configured to facilitate communications with other devices, such as peripherals, computers, or other computing devices via the WPAN.

The sensor components 1008 include a magnetometer 1028, an ambient light sensor 1030, a proximity sensor 1032, an accelerometer 1034, a gyroscope 1036, and a Global Positioning System sensor ("GPS sensor") 1038. It is contemplated that other sensors, such as, but not limited to, temperature sensors or shock detection sensors, also may be incorporated in the computing device architecture 1000.

The magnetometer 1028 is configured to measure the strength and direction of a magnetic field. In some configurations the magnetometer 1028 provides measurements to a compass application program stored within one of the memory components 1004 in order to provide a user with accurate directions in a frame of reference including the cardinal directions, north, south, east, and west. Similar measurements may be provided to a navigation application program that includes a compass component. Other uses of measurements obtained by the magnetometer 1028 are contemplated.

The ambient light sensor 1030 is configured to measure ambient light. In some configurations, the ambient light sensor 1030 provides measurements to an application program stored within one the memory components 1004 in order to automatically adjust the brightness of a display (described below) to compensate for low-light and high-light environments. Other uses of measurements obtained by the ambient light sensor 1030 are contemplated.

The proximity sensor 1032 is configured to detect the presence of an object or thing in proximity to the computing device without direct contact. In some configurations, the proximity sensor 1032 detects the presence of a user's body (e.g., the user's face) and provides this information to an application program stored within one of the memory components 1004 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1028 are contemplated.

The accelerometer 1034 is configured to measure proper acceleration. In some configurations, output from the accelerometer 1034 is used by an application program as an input mechanism to control some functionality of the application program. For example, the application program may be a video game in which a character, a portion thereof, or an object is moved or otherwise manipulated in response to input received via the accelerometer 1034. In some configurations, output from the accelerometer 1034 is provided to an application program for use in switching between landscape and portrait modes, calculating coordinate acceleration, or detecting a fall. Other uses of the accelerometer 1034 are contemplated.

The gyroscope 1036 is configured to measure and maintain orientation. In some configurations, output from the gyroscope 1036 is used by an application program as an input mechanism to control some functionality of the application program. For example, the gyroscope 1036 can be used for accurate recognition of movement within a 3D environment of a video game application or some other application. In some configurations, an application program utilizes output from the gyroscope 1036 and the accelerometer 1034 to enhance control of some functionality of the application program. Other uses of the gyroscope 1036 are contemplated.

The GPS sensor 1038 is configured to receive signals from GPS satellites for use in calculating a location. The location calculated by the GPS sensor 1038 may be used by any application program that requires or benefits from location information. For example, the location calculated by the GPS sensor 1038 may be used with a navigation application program to provide directions from the location to a destination or directions from the destination to the location. Moreover, the GPS sensor 1038 may be used to provide location information to an external location-based service, such as E911 service. The GPS sensor 1038 may obtain location information generated via WI-FI, WIMAX, and/or cellular triangulation techniques utilizing one or more of the network connectivity components 1006 to aid the GPS sensor 1038 in obtaining a location fix. The GPS sensor 1038 may also be used in Assisted GPS ("A-GPS") systems.

The I/O components 1010 include a display 1040, a touchscreen 1042, a data I/O interface component ("data I/O") 1044, an audio I/O interface component ("audio I/O") 1046, a video I/O interface component ("video I/O") 1048, and a camera 1050. In some configurations, the display 1040 and the touchscreen 1042 are combined. In some configurations two or more of the data I/O component 1044, the audio I/O component 1046, and the video I/O component 1048 are combined. The I/O components 1010 may include discrete processors configured to support the various interface described below, or may include processing functionality built-in to the processor 1002.

The display 1040 is an output device configured to present information in a visual form. In particular, the display 1040 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1040 is a liquid crystal display ("LCD") utilizing any active or passive matrix technology and any backlighting technology (if used). In some configurations, the display 1040 is an organic light emitting diode ("OLED") display. Other display types are contemplated.

The touchscreen 1042, also referred to herein as a "touch-enabled screen," is an input device configured to detect the presence and location of a touch. The touchscreen 1042 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1042 is incorporated on top of the display 1040 as a transparent layer to enable a user to use one or more touches to interact with objects or other information presented on the display 1040. In other configurations, the touchscreen 1042 is a touch pad incorporated on a surface of the computing device that does not include the display 1040. For example, the computing device may have a touchscreen incorporated on top of the display 1040 and a touch pad on a surface opposite the display 1040.

In some configurations, the touchscreen 1042 is a single-touch touchscreen. In other configurations, the touchscreen 1042 is a multi-touch touchscreen. In some configurations, the touchscreen 1042 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1042. As such, a developer may create gestures that are specific to a particular application program.

In some configurations, the touchscreen 1042 supports a tap gesture in which a user taps the touchscreen 1042 once on an item presented on the display 1040. The tap gesture may be used for various reasons including, but not limited to, opening or launching whatever the user taps. In some configurations, the touchscreen 1042 supports a double tap gesture in which a user taps the touchscreen 1042 twice on an item presented on the display 1040. The double tap gesture may be used for various reasons including, but not limited to, zooming in or zooming out in stages. In some configurations, the touchscreen 1042 supports a tap and hold gesture in which a user taps the touchscreen 1042 and maintains contact for at least a pre-defined time. The tap and hold gesture may be used for various reasons including, but not limited to, opening a context-specific menu.

In some configurations, the touchscreen 1042 supports a pan gesture in which a user places a finger on the touchscreen 1042 and maintains contact with the touchscreen 1042 while moving the finger on the touchscreen 1042. The pan gesture may be used for various reasons including, but not limited to, moving through screens, images, or menus at a controlled rate. Multiple finger pan gestures are also contemplated. In some configurations, the touchscreen 1042 supports a flick gesture in which a user swipes a finger in the direction the user wants the screen to move. The flick gesture may be used for various reasons including, but not limited to, scrolling horizontally or vertically through menus or pages. In some configurations, the touchscreen 1042 supports a pinch and stretch gesture in which a user makes a pinching motion with two fingers (e.g., thumb and forefinger) on the touchscreen 1042 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 1042. As such, the above gestures should be understood as being illustrative and should not be construed as being limiting in any way.

The data I/O interface component 1044 is configured to facilitate input of data to the computing device and output of data from the computing device. In some configurations, the data I/O interface component 1044 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1046 is configured to provide audio input and/or output capabilities to the computing device. In some configurations, the audio I/O interface component 1046 includes a microphone configured to collect audio signals. In some configurations, the audio I/O interface component 1046 includes a headphone jack configured to provide connectivity for headphones or other external speakers. In some configurations, the audio I/O interface component 1046 includes a speaker for the output of audio signals. In some configurations, the audio I/O interface component 1046 includes an optical audio cable out.

The video I/O interface component 1048 is configured to provide video input and/or output capabilities to the computing device. In some configurations, the video I/O interface component 1048 includes a video connector configured to receive video as input from another device (e.g., a video media player such as a DVD or BLURAY player) or send video as output to another device (e.g., a monitor, a television, or some other external display). In some configurations, the video I/O interface component 1048 includes a High-Definition Multimedia Interface ("HDMI"), mini-HDMI, micro-HDMI, DisplayPort, or proprietary connector to input/output video content. In some configurations, the video I/O interface component 1048 or portions thereof is combined with the audio I/O interface component 1046 or portions thereof.

The camera 1050 can be configured to capture still images and/or video. The camera 1050 may utilize a charge coupled device ("CCD") or a complementary metal oxide semiconductor ("CMOS") image sensor to capture images. In some configurations, the camera 1050 includes a flash to aid in taking pictures in low-light environments. Settings for the camera 1050 may be implemented as hardware or software buttons.

Although not illustrated, one or more hardware buttons may also be included in the computing device architecture 1000. The hardware buttons may be used for controlling some operational aspect of the computing device. The hardware buttons may be dedicated buttons or multi-use buttons. The hardware buttons may be mechanical or sensor-based.

The illustrated power components 1012 include one or more batteries 1052, which can be connected to a battery gauge 1054. The batteries 1052 may be rechargeable or disposable. Rechargeable battery types include, but are not limited to, lithium polymer, lithium ion, nickel cadmium, and nickel metal hydride. Each of the batteries 1052 may be made of one or more cells.

The battery gauge 1054 can be configured to measure battery parameters such as current, voltage, and temperature. In some configurations, the battery gauge 1054 is configured to measure the effect of a battery's discharge rate, temperature, age and other factors to predict remaining life within a certain percentage of error. In some configurations, the battery gauge 1054 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1012 may also include a power connector, which may be combined with one or more of the aforementioned I/O components 1010. The power components 1012 may interface with an external power system or charging equipment via an I/O component.

The disclosure presented herein may be considered in view of the following clauses.

Clause 1: A computer-implemented example comprising computer-implemented operations for obtaining an image including an arrangement of a plurality of characters; generating data representing individual characters of the plurality of characters; determining an arrangement type based on the arrangement of the plurality of characters; determining a data type of at least one character of the plurality of characters; and arranging the data in a data structure (601A) based on the arrangement type and the data type of the at least one character of the plurality of characters.

Clause 2: The example of Clause 1, further comprising computer-implemented operations for obtaining a second image comprising a second arrangement of a second plurality of characters; generating other data representing individual characters of the second plurality of characters; determining a second data type of at least one character of the second plurality of characters; arranging the other data in the data structure based on the second arrangement of the second plurality of characters and the second data type.

Clause 3: The example of Clauses 1 and 2, wherein the data type and the second data type identify an anchor, and wherein the data representing individual characters of the plurality of characters and the other data representing individual characters of the second plurality of characters are merged in the data structure based on the anchor.

Clause 4: The example of Clauses 1-3, further including computer-implemented operations for: displaying the data structure on an interface configured to receive an input gesture for modifying the data structure, wherein the display of the data structure is performed simultaneously as a camera of a computing device is obtaining the image; receiving the input gesture to modify the data structure; and modifying the data representative of the plurality of characters based on the input gesture.

Clause 5: The example of Clauses 1-4, wherein determining the data type of the at least one character of the plurality of characters is based on a format of the at least one character of the plurality of characters, a font of the at least one character of the plurality of characters or at least one text pattern formed from the plurality of characters.

Clause 6: The example of Clauses 1-5, wherein the plurality of characters comprises the at least one character and other characters, wherein the data type indicates that data representing the at least one character is a header, and wherein arranging the data in the data structure comprises distinguishing a display of the data representing the at least one character from a display of data representing other characters of the plurality of characters.

Clause 7: The example of Clauses 1-6, wherein the plurality of characters comprises the at least one character and other characters, and wherein the computer-implemented method further includes identifying a second data type of the other characters, wherein the second data type is incompatible with the data type; and providing a graphical distinction between a display of data representing the at least one character from a display of other data representing the other characters.

Clause 8: The example of Clauses 1-7, computer-implemented operations for generating at least one equation utilizing a data set, the data set consisting of the other data representing other characters of the plurality of characters.

Clause 9: An example computer (800, 1000) including a processor (802, 1002); and a computer-readable storage medium (804, 1004) in communication with the processor (802, 1002), the computer-readable storage medium (804, 1004) having computer-executable instructions stored thereupon which, when executed by the processor (802, 1002), cause the computer (800, 1000) to obtain an image (400) comprising an arrangement of a plurality of characters, generate data representing individual characters of the plurality of characters, determine a data type of at least one character of the plurality of characters, wherein the data type is based on the at least one character, the arrangement of the plurality of characters or contextual data interpreted from the image, and arrange the data in a data structure (601A) based on the data type of the at least one character of the plurality of characters.

Clause 10: The example of Clause 9, wherein the computer-readable storage medium has further computer-executable instructions stored thereupon which, when executed by the processor, cause the computer to: obtain a second image comprising a second arrangement of a second plurality of characters; generate other data representing individual characters of the second plurality of characters; determine a second data type of at least one character of the second plurality of characters; and arrange the other data in the data structure based on the second arrangement of the second plurality of characters and the second data type.

Clause 11: The example of Clauses 9-10, wherein the data type and the second data type identify an anchor, and wherein the data representing individual characters of the plurality of characters and the other data representing individual characters of the second plurality of characters are merged in the data structure based on the anchor.

Clause 12: The example of Clauses 9-11, wherein the computer-readable storage medium has further computer-executable instructions stored thereupon which, when executed by the processor, cause the computer to: display the data structure on an interface configured to receive an input gesture for modifying the data structure, wherein the display of the data structure is performed simultaneously as a camera of the computer is capturing the image; receive the input gesture to modify the data structure; and modify the data representative of the plurality of characters based on the input gesture.

Clause 13: The example of Clauses 9-12, wherein determining the data type of at least one character of the plurality of characters is based on a format of the at least one character of the plurality of characters or at least one text pattern formed from the plurality of characters.

Clause 14: The example of Clauses 9-13, wherein the data type indicates that data representing the at least one character is a header, and wherein arranging the data in the data structure comprises distinguishing a display of the data representing the at least one character from a display of data representing other characters of the plurality of characters.

Clause 15: The example of Clauses 9-14, wherein the plurality of characters comprises the at least one character and other characters, and wherein the computer-readable storage medium has further computer-executable instructions stored thereupon which, when executed by the processor, cause the computer to: identify a second data type of the other characters, wherein the second data type is incompatible with the data type; and provide a graphical distinction between a display of data representing the at least one character and a display of other data representing the other characters.

Clause 16: The example of Clauses 9-15, wherein the computer-readable storage medium has further computer-executable instructions stored thereupon which, when executed by the processor, cause the processor to generate at least one equation utilizing a data set, the data set consisting of the other data representing other characters of the plurality of characters.

Clause 17: An example computer-readable storage medium having computer-executable instructions stored thereupon which, when executed by a computer, cause the computer to: obtain an image (400) comprising an arrangement of a plurality of characters; generate data representing individual characters of the plurality of characters; determine an arrangement type based on the arrangement of the plurality of characters; determine a data type of at least one character of the plurality of characters, wherein the data type is based on the at least one character, the arrangement of the plurality of characters or contextual data interpreted from the image; and arrange the data in a data structure (601A) based on the arrangement type and the data type of the at least one character of the plurality of characters.

Clause 18: The example of Clause 17, having further computer-executable instructions stored thereupon that cause the computer to: obtain a second image comprising a second arrangement of a second plurality of characters; generate other data representing individual characters of the second plurality of characters; determine a second arrangement type of the second plurality of characters; determine a second data type of at least one character of the second plurality of characters; and arrange the other data in the data structure based on the second arrangement of the second plurality of characters, the second arrangement type and the second data type.

Clause 19: The example of Clauses 17-18, wherein the arrangement type and the second arrangement type identify an anchor, and wherein the data representing individual characters of the plurality of characters and the other data representing individual characters of the second plurality of characters are merged in the data structure based on the anchor.

Clause 20: The example of Clauses 17-19, wherein the plurality of characters comprises the at least one character and other characters, and wherein the computer-readable storage medium has further computer-executable instructions stored thereupon that cause the computer to: identify a second data type of the other characters, wherein the second data type is incompatible with the data type; and provide a graphical distinction between a display of data representing the at least one character and a display of other data representing the other characters.

Clause 21: An example system including a means for obtaining an image including an arrangement of a plurality of characters; means for generating data representing individual characters of the plurality of characters; means for determining an arrangement type based on the arrangement of the plurality of characters; means for determining a data type of at least one character of the plurality of characters; and means for arranging the data in a data structure (601A) based on the arrangement type and the data type of the at least one character of the plurality of characters.

Clause 22: The example of Clause 21, further including a means for obtaining a second image comprising a second arrangement of a second plurality of characters; means for generating other data representing individual characters of the second plurality of characters; determining a second data type of at least one character of the second plurality of characters; arranging the other data in the data structure based on the second arrangement of the second plurality of characters and the second data type.

Clause 23: The example of Clauses 21 and 22, wherein the data type and the second data type identify an anchor, and wherein the data representing individual characters of the plurality of characters and the other data representing individual characters of the second plurality of characters are merged in the data structure based on the anchor.

Clause 24: The example of Clauses 21-23, further including a means for displaying the data structure on an interface configured to receive an input gesture for modifying the data structure, wherein the display of the data structure is performed simultaneously as a camera of a computing device is obtaining the image; receiving the input gesture to modify the data structure; and modifying the data representative of the plurality of characters based on the input gesture.

Clause 25: The example of Clauses 21-24, wherein the means for determining the data type of the at least one character of the plurality of characters is based on a format of the at least one character of the plurality of characters, a font of the at least one character of the plurality of characters or at least one text pattern formed from the plurality of characters.

Clause 26: The example of Clauses 21-25, wherein the plurality of characters comprises the at least one character and other characters, wherein the data type indicates that data representing the at least one character is a header, and wherein arranging the data in the data structure comprises distinguishing a display of the data representing the at least one character from a display of data representing other characters of the plurality of characters.

Clause 27: The example of Clauses 21-26, wherein the plurality of characters comprises the at least one character and other characters, and wherein the system further includes a means for identifying a second data type of the other characters, wherein the second data type is incompatible with the data type; and a means for providing a graphical distinction between a display of data representing the at least one character from a display of other data representing the other characters.

Clause 28: The example of Clauses 21-27, the means for generating at least one equation utilizes a data set, the data set consisting of the other data representing other characters of the plurality of characters.

Based on the foregoing, it should be appreciated that concepts and technologies have been disclosed herein that for provide enhanced optical character recognition of arranged data. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method comprising computer-implemented operations for:
    obtaining an image comprising an arrangement of a plurality of characters;
    generating data representing individual characters of the plurality of characters;
    determining an arrangement type based on the arrangement of the plurality of characters;
    determining a data type of at least one character of the plurality of characters;
    arranging the data representing the individual characters of the plurality of characters in a data structure based on the arrangement type and the data type of the at least one character of the plurality of characters;
    displaying the data structure on an interface configured to receive an input gesture to modify the data structure, wherein the displaying of the data structure is performed simultaneously as a camera of a computing device is obtaining the image;
    receiving the input gesture to modify the data structure; and
    modifying the data representing the individual characters of the plurality of characters based on the input gesture.

2. The computer-implemented method of claim 1, further comprising computer-implemented operations for:
    obtaining a second image comprising a second arrangement of a second plurality of characters;
    generating other data representing individual characters of the second plurality of characters;

determining a second data type of at least one character of the second plurality of characters; and arranging the other data representing the individual characters of the second plurality of characters in the data structure based on the second arrangement of the second plurality of characters and the second data type.

3. The computer-implemented method of claim 2, wherein the data type and the second data type identify an anchor, and wherein the data representing the individual characters of the plurality of characters and the other data representing the individual characters of the second plurality of characters are merged in the data structure based on the anchor.

4. The computer-implemented method of claim 1, wherein the determining the data type of the at least one character of the plurality of characters is based on a format of the at least one character of the plurality of characters, a font of the at least one character of the plurality of characters, or at least one text pattern formed from the plurality of characters.

5. The computer-implemented method of claim 1, wherein the plurality of characters comprises the at least one character and other characters, wherein the data type indicates that data representing the at least one character is a header, and wherein the arranging the data in the data structure comprises distinguishing a display of the data representing the at least one character from a display of data representing the other characters of the plurality of characters.

6. The computer-implemented method of claim 1, wherein the plurality of characters comprises the at least one character and other characters, and wherein the computer-implemented method further comprises computer-implemented operations for:

identifying a second data type of the other characters, wherein the second data type of the other characters is incompatible with the data type of the at least one character of the plurality of characters; and providing a graphical distinction between a display of data representing the at least one character from a display of other data representing the other characters.

7. The computer-implemented method of claim 6, further comprising computer-implemented operations for generating at least one equation utilizing a data set, the data set consisting of the other data representing the other characters of the plurality of characters.

8. A computer, comprising:
a processor; and
a computer-readable storage medium in communication with the processor, the computer-readable storage medium having computer-executable instructions stored thereupon which, when executed by the processor, cause the computer to:
obtain an image comprising an arrangement of a plurality of characters,
generate data representing individual characters of the plurality of characters,
determine a data type of at least one character of the plurality of characters, wherein the data type is based on the at least one character, the arrangement of the plurality of characters, or contextual data interpreted from the image,
arrange the data representing the individual characters of the plurality of characters in a data structure based on the data type of the at least one character of the plurality of characters,
display the data structure on an interface configured to receive an input gesture to modify the data structure, wherein the display of the data structure is performed simultaneously as a camera of the computer is capturing the image,
receive the input gesture to modify the data structure, and
modify the data representing individual characters of the plurality of characters based on the input gesture.

9. The computer of claim 8, wherein the computer-readable storage medium has further computer-executable instructions stored thereupon which, when executed by the processor, cause the computer to:

obtain a second image comprising a second arrangement of a second plurality of characters;

generate other data representing individual characters of the second plurality of characters;

determine a second data type of at least one character of the second plurality of characters; and arrange the other data representing the individual characters of the second plurality of characters in the data structure based on the second arrangement of the second plurality of characters and the second data type.

10. The computer of claim 9, wherein the data type and the second data type identify an anchor, and wherein the data representing the individual characters of the plurality of characters and the other data representing the individual characters of the second plurality of characters are merged in the data structure based on the anchor.

11. The computer of claim 8, wherein the determining the data type of the at least one character of the plurality of characters is based on a format of the at least one character of the plurality of characters or at least one text pattern formed from the plurality of characters.

12. The computer of claim 8, wherein the data type indicates that data representing the at least one character is a header, and wherein the arranging the data representing the individual characters of the plurality of characters in the data structure comprises distinguishing a display of the data representing the at least one character from a display of data representing other characters of the plurality of characters.

13. The computer of claim 8, wherein the plurality of characters comprises the at least one character and other characters, and wherein the computer-readable storage medium has further computer-executable instructions stored thereupon which, when executed by the processor, cause the computer to:

identify a second data type of the other characters, wherein the second data type is incompatible with the data type; and provide a graphical distinction between a display of data representing the at least one character and a display of other data representing the other characters.

14. The computer of claim 13, wherein the computer-readable storage medium has further computer-executable instructions stored thereupon which, when executed by the processor, cause the processor to generate at least one equation utilizing a data set, the data set consisting of the other data representing the other characters of the plurality of characters.

15. A computer-readable storage medium having computer-executable instructions stored thereupon which, when executed by a computer, cause the computer to:

obtain an image comprising an arrangement of a plurality of characters;

generate data representing individual characters of the plurality of characters;

determine an arrangement type based on the arrangement of the plurality of characters;

determine a data type of at least one character of the plurality of characters, wherein the data type is based on the at least one character, the arrangement of the plurality of characters, or contextual data interpreted from the image;

arrange the data representing the individual characters of the plurality of characters in a data structure based on the arrangement type and the data type of the at least one character of the plurality of characters;

display the data structure on an interface configured to receive an input gesture to modify the data structure, wherein the display of the data structure is performed simultaneously as a camera of the computer is capturing the image;

receive the input gesture to modify the data structure; and modify the data representing the individual characters of the plurality of characters based on the input gesture.

16. The computer-readable storage medium of claim 15, having further computer-executable instructions stored thereupon, which when executed by the computer, cause the computer to:

obtain a second image comprising a second arrangement of a second plurality of characters;

generate other data representing individual characters of the second plurality of characters;

determine a second arrangement type of the second plurality of characters;

determine a second data type of at least one character of the second plurality of characters; and arrange the other data representing the individual characters of the second plurality of characters in the data structure based on the second arrangement of the second plurality of characters, the second arrangement type, and the second data type.

17. The computer-readable storage medium of claim 16, wherein the arrangement type and the second arrangement type identify an anchor, and wherein the data representing the individual characters of the plurality of characters and the other data representing the individual characters of the second plurality of characters are merged in the data structure based on the anchor.

18. The computer-readable storage medium of claim 15, wherein the plurality of characters comprises the at least one character and other characters, and wherein the computer-readable storage medium has further computer-executable instructions stored thereupon, which when executed by the computer, cause the computer to:

identify a second data type of the other characters, wherein the second data type is incompatible with the data type; and provide a graphical distinction between a display of data representing the at least one character and a display of other data representing the other characters.

* * * * *